United States Patent
Labrosse et al.

(10) Patent No.: US 9,907,396 B1
(45) Date of Patent: Mar. 6, 2018

(54) HEIGHT ADJUSTABLE SUPPORT SURFACE AND SYSTEM FOR ENCOURAGING HUMAN MOVEMENT AND PROMOTING WELLNESS

(71) Applicant: Steelcase Inc., Grand Rapids, MI (US)

(72) Inventors: Jean-Paul Labrosse, Altadena, CA (US); Michael Xinjie Chu, Los Angeles, CA (US); Scott Sullivan, San Francisco, CA (US)

(73) Assignee: STEELCASE INC., Grand Rapids, MI (US)

( * ) Notice: Subject to any disclaimer, the term of this patent is extended or adjusted under 35 U.S.C. 154(b) by 0 days.

(21) Appl. No.: 15/474,983

(22) Filed: Mar. 30, 2017

Related U.S. Application Data

(63) Continuation of application No. 15/285,939, filed on Oct. 5, 2016, which is a continuation of application
(Continued)

(51) Int. Cl.
*A47B 9/00* (2006.01)
*A47B 21/02* (2006.01)
(Continued)

(52) U.S. Cl.
CPC ............... *A47B 21/02* (2013.01); *A47B 9/00* (2013.01); *A47B 9/20* (2013.01); *A47B 21/06* (2013.01);
(Continued)

(58) Field of Classification Search
CPC ..... A47B 9/00; A47B 9/20; A47B 2200/0062; A47B 2200/0056; A47B 2200/0061;
(Continued)

(56) References Cited

U.S. PATENT DOCUMENTS

| | | | |
|---|---|---|---|
| 3,953,770 A | 4/1976 | Hayashi | |
| 4,163,929 A * | 8/1979 | Janu | A61B 6/0457 318/628 |

(Continued)

FOREIGN PATENT DOCUMENTS

| | | |
|---|---|---|
| CN | 202286910 U | 7/2012 |
| DE | 19604329 A1 | 8/1997 |

(Continued)

OTHER PUBLICATIONS

Anthro Corporation, Can Anthro "Walk the Talk"?: Employees Embark on a 30-Day Sit-Stand Challenge, Press Release Oct. 11, 2010, www.anthro.com/press-releases/2010/employees-embark-on-a-30-day-sit-stand-challenge, Copyright 2016, 4 pages.
(Continued)

*Primary Examiner* — Daniel J Troy
*Assistant Examiner* — Timothy M Ayres
(74) *Attorney, Agent, or Firm* — Quarles & Brady LLP

(57) ABSTRACT

A system for adjusting the height of a workstation for use by a user, the system comprising a frame, a worktop having an upper work surface, the worktop being vertically slidably attached to said frame and selectably adjustable in elevation to different positions including at least a first standing position and at least a first sitting position, at least one variable speed electrically-powered vertical-displacement drive mechanism connected between said frame and said worktop, said drive mechanism being arranged to selectively vertically displace the worktop with respect to said frame when said drive mechanism is activated and a processor controlling the drive mechanism to move the worktop to different positions, the processor controlling the drive mechanism to control the rate of worktop height displacement at various speeds including at least a first speed and a second speed that is different than the first speed, the
(Continued)

processor controlling the rate of worktop height displacement at the first speed sometimes and at the second speed at other times.

30 Claims, 12 Drawing Sheets

Related U.S. Application Data

No. 14/035,974, filed on Sep. 25, 2013, now Pat. No. 9,486,070.

(60) Provisional application No. 61/795,222, filed on Oct. 10, 2012.

(51) Int. Cl.
    *A47B 9/20*     (2006.01)
    *A47B 21/06*     (2006.01)
    *F16L 3/01*     (2006.01)
    *G05B 19/048*     (2006.01)
    *A47B 97/00*     (2006.01)

(52) U.S. Cl.
    CPC .............. *F16L 3/01* (2013.01); *G05B 19/048* (2013.01); *A47B 2097/003* (2013.01); *A47B 2200/0054* (2013.01); *A47B 2200/0056* (2013.01); *A47B 2200/0061* (2013.01); *A47B 2200/0062* (2013.01); *G05B 2219/24015* (2013.01)

(58) Field of Classification Search
    CPC ... A47B 2200/008; A47B 21/02; A47B 17/02; G06Q 10/1091; G05B 19/048; G05B 2219/24015; A63B 71/0622; A63B 24/0075; A63B 2024/0068; G06F 19/3481
    USPC .............. 108/50.02, 147, 20–22; 312/330.1, 312/319.5–319.9
    See application file for complete search history.

(56) References Cited

U.S. PATENT DOCUMENTS

| | | | |
|---|---|---|---|
| 4,440,096 | A | 4/1984 | Rice et al. |
| 4,571,682 | A | 2/1986 | Silverman et al. |
| 4,779,865 | A | 10/1988 | Lieberman et al. |
| 4,821,118 | A | 4/1989 | Lafreniere |
| 4,828,257 | A | 5/1989 | Dyer et al. |
| 4,849,733 | A | 7/1989 | Conigliaro et al. |
| 4,894,600 | A | 1/1990 | Kearney |
| 5,019,950 | A | 5/1991 | Johnson |
| 5,022,384 | A | 6/1991 | Freels et al. |
| 5,140,977 | A | 8/1992 | Raffel |
| 5,224,429 | A * | 7/1993 | Borgman ................. A47B 9/00 108/147 |
| 5,259,326 | A | 11/1993 | Borgman et al. |
| 5,305,238 | A | 4/1994 | Starr, III et al. |
| 5,308,296 | A | 5/1994 | Eckstein |
| 5,323,695 | A | 6/1994 | Borgman et al. |
| 5,335,188 | A | 8/1994 | Brisson |
| 5,371,693 | A | 12/1994 | Nakazoe |
| 5,412,297 | A | 5/1995 | Clark et al. |
| 5,435,799 | A | 7/1995 | Lundin |
| 5,456,648 | A | 10/1995 | Edinburg et al. |
| 5,583,831 | A | 12/1996 | Churchill et al. |
| 5,612,869 | A | 3/1997 | Letzt et al. |
| 5,765,910 | A | 6/1998 | Larkin et al. |
| 5,853,005 | A | 12/1998 | Scanlon |
| 5,870,647 | A | 2/1999 | Nada et al. |
| 5,890,997 | A | 4/1999 | Roth |
| 5,944,633 | A | 8/1999 | Wittrock |
| 6,013,008 | A | 1/2000 | Fukushima |
| 6,014,572 | A | 1/2000 | Takahashi |
| 6,030,351 | A | 2/2000 | Schmidt et al. |
| 6,032,108 | A | 2/2000 | Sciple et al. |
| 6,075,755 | A | 6/2000 | Zarchan |
| 6,135,951 | A | 10/2000 | Richardson et al. |
| 6,142,910 | A | 11/2000 | Heuvelman |
| 6,161,095 | A | 12/2000 | Brown |
| 6,286,441 | B1 | 9/2001 | Burdi et al. |
| 6,296,408 | B1 | 10/2001 | Larkin et al. |
| 6,312,363 | B1 | 11/2001 | Watterson et al. |
| 6,360,675 | B1 | 3/2002 | Jones |
| 6,447,424 | B1 | 9/2002 | Ashby et al. |
| 6,458,060 | B1 | 10/2002 | Watterson et al. |
| 6,527,674 | B1 | 3/2003 | Clem |
| 6,595,144 | B1 | 7/2003 | Doyle |
| 6,622,116 | B2 | 9/2003 | Skinner et al. |
| 6,669,286 | B2 | 12/2003 | Iusim |
| 6,702,719 | B1 | 3/2004 | Brown et al. |
| 6,716,139 | B1 | 4/2004 | Hosseinzadeh-Dolkhani et al. |
| 6,746,371 | B1 | 6/2004 | Brown et al. |
| 6,749,537 | B1 | 6/2004 | Hickman |
| 6,790,178 | B1 | 9/2004 | Mault et al. |
| 6,793,607 | B2 | 9/2004 | Neil |
| 6,964,370 | B1 | 11/2005 | Hagale et al. |
| 6,977,476 | B2 | 12/2005 | Koch |
| 6,987,221 | B2 | 1/2006 | Platt |
| 7,030,735 | B2 | 4/2006 | Chen |
| 7,063,644 | B2 | 6/2006 | Albert et al. |
| 7,070,539 | B2 | 7/2006 | Brown et al. |
| 7,128,693 | B2 | 10/2006 | Brown et al. |
| 7,141,028 | B2 | 11/2006 | Aminian et al. |
| 7,161,490 | B2 | 1/2007 | Huiban |
| 7,172,530 | B1 | 2/2007 | Hercules |
| 7,301,463 | B1 | 11/2007 | Paterno |
| 7,327,442 | B1 | 2/2008 | Fear et al. |
| 7,439,956 | B1 | 10/2008 | Albouyeh et al. |
| 7,510,508 | B2 | 3/2009 | Santomassimo et al. |
| 7,523,905 | B2 | 4/2009 | Timm et al. |
| 7,538,284 | B2 * | 5/2009 | Nielsen ................. A47B 9/00 200/296 |
| 7,594,873 | B2 | 9/2009 | Terao et al. |
| 7,614,001 | B2 | 11/2009 | Abbott et al. |
| 7,628,737 | B2 | 12/2009 | Kowallis et al. |
| 7,635,324 | B2 | 12/2009 | Balls |
| 7,637,847 | B1 | 12/2009 | Hickman |
| 7,640,866 | B1 | 1/2010 | Schermerhorn |
| 7,652,230 | B2 * | 1/2010 | Baier ................. D06F 39/005 219/483 |
| 7,661,292 | B2 | 2/2010 | Buitmann et al. |
| 7,717,827 | B2 | 5/2010 | Kurunmaki et al. |
| 7,722,503 | B1 | 5/2010 | Smith et al. |
| 7,735,918 | B2 | 6/2010 | Beck |
| 7,857,731 | B2 | 12/2010 | Hickman et al. |
| 7,884,808 | B2 | 2/2011 | Joo |
| 7,892,148 | B1 | 2/2011 | Stauffer et al. |
| 7,909,737 | B2 | 3/2011 | Ellis et al. |
| 7,914,468 | B2 | 3/2011 | Shalon et al. |
| 7,931,563 | B2 | 4/2011 | Shaw et al. |
| 7,955,219 | B2 | 6/2011 | Birrell et al. |
| 8,001,472 | B2 | 8/2011 | Gilley et al. |
| 8,024,202 | B2 | 9/2011 | Carroll et al. |
| 8,047,966 | B2 | 11/2011 | Dorogusker et al. |
| 8,051,782 | B2 | 11/2011 | Nethken et al. |
| 8,052,580 | B2 | 11/2011 | Saalasti et al. |
| 8,092,346 | B2 | 1/2012 | Shea |
| 8,105,209 | B2 | 1/2012 | Lannon et al. |
| 8,109,858 | B2 | 2/2012 | Redmann |
| 8,159,335 | B2 | 4/2012 | Cox, Jr. |
| 8,167,776 | B2 | 5/2012 | Lannon et al. |
| 8,206,325 | B1 | 6/2012 | Najafi et al. |
| 8,257,228 | B2 | 9/2012 | Quatrochi et al. |
| 8,361,000 | B2 | 1/2013 | Gaspard |
| 8,381,603 | B2 | 2/2013 | Peng et al. |
| 8,432,356 | B2 | 4/2013 | Chase |
| 8,462,921 | B2 | 6/2013 | Parker |
| 8,522,695 | B2 | 9/2013 | Ellegaard |
| 8,540,641 | B2 | 9/2013 | Kroll et al. |
| 8,550,820 | B2 | 10/2013 | Soltanoff |
| 8,560,336 | B2 | 10/2013 | Schwarzberg et al. |
| 8,593,286 | B2 | 11/2013 | Razoumov et al. |

(56) References Cited

U.S. PATENT DOCUMENTS

| | | | |
|---|---|---|---|
| 8,595,023 B2 | 11/2013 | Kirchhoff et al. | |
| 8,620,617 B2 | 12/2013 | Yuen et al. | |
| 8,668,045 B2 | 3/2014 | Cohen | |
| 8,688,467 B2 | 4/2014 | Harrison et al. | |
| 8,690,578 B1 | 4/2014 | Nusbaum et al. | |
| 8,690,735 B2 | 4/2014 | Wafferson et al. | |
| 8,700,690 B2 | 4/2014 | Raghav et al. | |
| 8,771,222 B2 | 7/2014 | Kanderian, Jr. et al. | |
| 8,812,096 B2 | 8/2014 | Flaherty et al. | |
| 8,814,754 B2 | 8/2014 | Weast et al. | |
| 8,818,782 B2 | 8/2014 | Thukral et al. | |
| 8,821,350 B2 | 9/2014 | Maertz | |
| 8,825,482 B2 | 9/2014 | Hernandez-Abrego et al. | |
| 8,836,500 B2 | 9/2014 | Houvener et al. | |
| 8,847,988 B2 | 9/2014 | Geisner et al. | |
| 8,947,215 B2 | 2/2015 | Mandel et al. | |
| 8,965,541 B2 | 2/2015 | Martinez et al. | |
| 8,984,685 B2 | 3/2015 | Robertson et al. | |
| 8,997,588 B2 | 4/2015 | Taylor | |
| 9,049,923 B1 | 6/2015 | Delagey et al. | |
| 9,084,475 B2 * | 7/2015 | Hjelm | A47B 9/00 |
| 9,119,568 B2 | 9/2015 | Yin et al. | |
| 9,167,894 B2 | 10/2015 | DesRoches et al. | |
| 9,236,817 B2 | 1/2016 | Strothmann et al. | |
| 9,486,070 B2 | 11/2016 | Labrosse et al. | |
| 2001/0013307 A1 | 8/2001 | Stone | |
| 2001/0028308 A1 | 10/2001 | De La Huerga | |
| 2002/0055419 A1 | 5/2002 | Hinnebusch | |
| 2002/0145512 A1 | 10/2002 | Sleichter, III et al. | |
| 2004/0010328 A1 * | 1/2004 | Carson | G06Q 10/00 700/90 |
| 2004/0014014 A1 | 1/2004 | Hess | |
| 2004/0229729 A1 | 11/2004 | Albert et al. | |
| 2004/0239161 A1 | 12/2004 | Lee | |
| 2005/0058970 A1 | 3/2005 | Perlman et al. | |
| 2005/0113649 A1 | 5/2005 | Bergantino | |
| 2005/0165626 A1 | 7/2005 | Karpf | |
| 2005/0172311 A1 | 8/2005 | Hjelt et al. | |
| 2005/0182653 A1 | 8/2005 | Urban et al. | |
| 2005/0202934 A1 | 9/2005 | Olrik et al. | |
| 2005/0209051 A1 | 9/2005 | Santomassimo et al. | |
| 2006/0063980 A1 | 3/2006 | Hwang et al. | |
| 2006/0205564 A1 | 9/2006 | Peterson | |
| 2006/0241520 A1 | 10/2006 | Robertson | |
| 2006/0250524 A1 | 11/2006 | Roche | |
| 2006/0266791 A1 | 11/2006 | Koch et al. | |
| 2007/0135264 A1 | 6/2007 | Rosenberg | |
| 2007/0179355 A1 | 8/2007 | Rosen | |
| 2007/0200396 A1 * | 8/2007 | Baumann | A61B 6/0457 297/135 |
| 2007/0219059 A1 | 9/2007 | Schwartz et al. | |
| 2007/0265138 A1 | 11/2007 | Ashby | |
| 2008/0030317 A1 | 2/2008 | Bryant | |
| 2008/0045384 A1 | 2/2008 | Matsubara et al. | |
| 2008/0051256 A1 | 2/2008 | Ashby et al. | |
| 2008/0077620 A1 | 3/2008 | Gilley et al. | |
| 2008/0098525 A1 | 5/2008 | Doleschal et al. | |
| 2008/0132383 A1 | 6/2008 | Einav et al. | |
| 2008/0245279 A1 | 10/2008 | Pan | |
| 2008/0255794 A1 | 10/2008 | Levine | |
| 2008/0256445 A1 | 10/2008 | Olch et al. | |
| 2008/0300914 A1 | 12/2008 | Karkanias et al. | |
| 2008/0304365 A1 | 12/2008 | Jarvis et al. | |
| 2008/0306351 A1 | 12/2008 | Izumi | |
| 2009/0076335 A1 | 3/2009 | Schwarzberg et al. | |
| 2009/0078167 A1 * | 3/2009 | Ellegaard | A47B 9/00 108/21 |
| 2009/0132579 A1 | 5/2009 | Kwang | |
| 2009/0156363 A1 | 6/2009 | Guidi et al. | |
| 2009/0195393 A1 | 8/2009 | Tegeler | |
| 2009/0229475 A1 | 9/2009 | Bally et al. | |
| 2009/0270227 A1 | 10/2009 | Ashby et al. | |
| 2009/0273441 A1 | 11/2009 | Mukherjee | |
| 2010/0049008 A1 | 2/2010 | Doherty et al. | |
| 2010/0073162 A1 | 3/2010 | Johnson et al. | |
| 2010/0135502 A1 | 6/2010 | Keady et al. | |
| 2010/0185398 A1 | 7/2010 | Berns et al. | |
| 2010/0198374 A1 | 8/2010 | Carson et al. | |
| 2010/0201201 A1 | 8/2010 | Mobarhan et al. | |
| 2010/0205542 A1 | 8/2010 | Walman | |
| 2010/0234184 A1 | 9/2010 | Le Page et al. | |
| 2010/0323846 A1 | 12/2010 | Komatsu et al. | |
| 2011/0015041 A1 | 1/2011 | Shea | |
| 2011/0015495 A1 | 1/2011 | Dothie et al. | |
| 2011/0033830 A1 | 2/2011 | Cherian | |
| 2011/0054359 A1 | 3/2011 | Sazonov et al. | |
| 2011/0080290 A1 * | 4/2011 | Baxi | A61B 5/1116 340/573.1 |
| 2011/0104649 A1 | 5/2011 | Young et al. | |
| 2011/0120351 A1 | 5/2011 | Shoenfeld | |
| 2011/0182438 A1 | 7/2011 | Koike et al. | |
| 2011/0184748 A1 | 7/2011 | Fierro et al. | |
| 2011/0245979 A1 | 10/2011 | Koch | |
| 2011/0275939 A1 | 11/2011 | Walsh et al. | |
| 2011/0281248 A1 | 11/2011 | Feenstra et al. | |
| 2011/0281687 A1 | 11/2011 | Gilley et al. | |
| 2011/0296306 A1 | 12/2011 | Oddsson et al. | |
| 2012/0015779 A1 | 1/2012 | Powch et al. | |
| 2012/0051579 A1 | 3/2012 | Cohen | |
| 2012/0116550 A1 | 5/2012 | Hoffman et al. | |
| 2012/0173319 A1 | 7/2012 | Ferrara | |
| 2012/0316661 A1 | 12/2012 | Rahman et al. | |
| 2013/0002533 A1 | 1/2013 | Burroughs et al. | |
| 2013/0012788 A1 | 1/2013 | Horseman | |
| 2013/0116092 A1 * | 5/2013 | Martinez | A63B 24/0062 482/9 |
| 2013/0144470 A1 | 6/2013 | Ricci | |
| 2013/0199419 A1 | 8/2013 | Hjelm | |
| 2013/0199420 A1 * | 8/2013 | Hjelm | A47B 9/00 108/20 |
| 2013/0207889 A1 | 8/2013 | Chang et al. | |
| 2013/0218309 A1 | 8/2013 | Napolitano | |
| 2013/0316316 A1 | 11/2013 | Flavell et al. | |
| 2013/0331993 A1 * | 12/2013 | Detsch | G05B 15/02 700/275 |
| 2014/0096706 A1 | 4/2014 | Labrosse et al. | |
| 2014/0109802 A1 * | 4/2014 | Dienes | A47B 9/00 108/50.11 |
| 2014/0137773 A1 | 5/2014 | Mandel et al. | |
| 2014/0156645 A1 | 6/2014 | Brust et al. | |
| 2014/0245932 A1 | 9/2014 | McKenzie, III et al. | |
| 2014/0249853 A1 | 9/2014 | Proud et al. | |
| 2014/0270254 A1 | 9/2014 | Oishi et al. | |
| 2015/0064671 A1 | 3/2015 | Murville et al. | |
| 2015/0071453 A1 | 3/2015 | Po et al. | |
| 2015/0142381 A1 | 5/2015 | Fitzsimmons et al. | |
| 2015/0302150 A1 | 10/2015 | Mazar et al. | |
| 2016/0051042 A1 | 2/2016 | Koch | |
| 2016/0309889 A1 | 10/2016 | Lin et al. | |
| 2017/0052517 A1 | 2/2017 | Tsai et al. | |
| 2017/0135636 A1 | 5/2017 | Park et al. | |

FOREIGN PATENT DOCUMENTS

| | | |
|---|---|---|
| DE | 10260478 A1 | 7/2004 |
| DE | 102008044848 A1 | 3/2010 |
| DE | 202014005160 U1 | 7/2014 |
| EP | 1159989 A1 | 12/2001 |
| EP | 1470766 A1 | 10/2004 |
| GB | 2424084 A | 9/2006 |
| JP | H11178798 A | 7/1999 |
| JP | 2001289975 A | 10/2001 |
| JP | 2005267491 A | 9/2005 |
| SE | 516479 C2 | 1/2002 |
| WO | 0219603 A2 | 3/2002 |
| WO | 02062425 A1 | 8/2002 |
| WO | 2005032363 A1 | 4/2005 |
| WO | 2005074754 A1 | 8/2005 |
| WO | 2006042415 A1 | 4/2006 |
| WO | 2006042420 A1 | 4/2006 |
| WO | 2006065679 A2 | 6/2006 |
| WO | 2007099206 A1 | 9/2007 |
| WO | 2008008729 A2 | 1/2008 |

(56) References Cited

FOREIGN PATENT DOCUMENTS

| WO | 2008050590 A1 | 2/2008 |
| WO | 2008101085 A2 | 8/2008 |
| WO | 2010019644 A2 | 2/2010 |
| WO | 2010023414 A1 | 3/2010 |
| WO | 2011133628 A1 | 10/2011 |
| WO | 2012061438 A2 | 5/2012 |
| WO | 2012108938 A1 | 8/2012 |
| WO | 2013033788 A1 | 3/2013 |

OTHER PUBLICATIONS

Benallal, et al., A Simple Algorithm for Object Location from a Single Image Without Camera Calibration, In International Conference on Computational Science and Its Applications, pp. 99-104. Springer Berlin Heidelberg, 2003.

Bendixen, et al., Pattern of Ventilation in Young Adults, Journal of Applied Physiology, 1964, 19(2):195-198.

BrianLaF, asp.net 4.0 TimePicker User Control, www.codeproject.com/articles/329011/asp-net-timepicker-user-control, Feb. 25, 2012, 5 pages.

Ejaz, Time Picker Ajax Extender Control, www.codeproject.com/articles/213311/time-picker-ajax-extender-control, Jun. 22, 2011, 8 pages.

Heddings, Stop Hitting Snooze: Change the Default Reminder Time for Outlook Appointments, www.howtogeek.com/howto/microsoft-office/stop-hitting-snooze-change-the-default-reminder-time-for-outlook-appointments, Apr. 25, 2008, 2 pages.

Hopkins Medicine, Vital Signs (Body Temperature, Pulse Rate, Respiration Rate, Blood Pressure). Source: Johns Hopkins Medicine Health Library, 2016, pp. 1-4.

Kriebel, How to Create a Two-Panel Column Chart in Tableau (And Save Lots of Time Compared to Excel), www.vizwiz.com/2012/02/how-to-create-two-panel-column-chart-in.html, 2012, 14 pages.

Microsoft, Automatically Adjust the Start and Finish Dates for New Projects, Applies To: Project 2007, Project Standard 2007, https://support.office.com/en-us/article/Automatically-adjust-the-start-and-finish-dates-for-new-projects-27c57cd1-44f3-4ea8-941a-dc5d56bdc540?ui=en-US&rs=en-US&ad=US&fromAR=1, Copyright 2017 Microsoft.

mrexcel.com, Forum: How to Calculate Percentage of Total Used Time, www.mrexcel.com/forum/excel-qestions/192521-how-calculate-percentage-total-used-time.html., Post Date: Mar. 20, 2006, 4 pages.

Paolo, Arduino Forum, Measuring Point to Point Distances With Accelerometer, http://forum.arduino.cc/index.php?action=printpage;topic=49902.0;images, Post Date: Jan. 26, 2011, 5 pages.

Process Dash, Using the Task & Schedule Tool, www.processdash.com/static/help/Topics/Planning/UsingTaskSchedule.html, Mar. 4, 2011.

Sun Microsystems, Lights Out Management Module, https://docs.oracle.com/cd/E19585-01/819-0445-10/lights_out.html, Copyright 2004, Sun Microsystems, Inc.

Wideman, Issues Regarding Total Time and Stage 1 Time, http://maxwideman.com/papers/resource/issues.html, 1994.

LINAK, Deskline Controls/Handsets User Manual, Copyright LINAK 2017.

LINAK, DPG Desk Panels—A New Way to Adjust Your Office Desk, Product News, May 19, 2017.

Steelcase, Inc., Airtouch Height-Adjustable Tables, Brochure, Copyright 2015 Steelcase Inc.

Steelcase, Inc., Migration Height-Adjustable Desk, Brochure, Copyright 2015 Steelcase Inc.

Steelcase, Inc., Ology Height-Adjustable Desk, Brochure, Copyright 2016 Steelcase Inc.

Steelcase, Inc., Series 5 Sit-To-Stand Height-Adjustable Tables, Brochure, Copyright 2015 Steelcase Inc.

Steelcase, Inc., Series 7 Enhanced Sit-To-Stand Height-Adjustable Tables, Brochure, Copyright 2015 Steelcase Inc.

LINAK, Deskline Deskpower DB4/DL4 Systems User Manual, Copyright Linak 2007.

LINAK, Deskline DL9/DB9/DL11 System User Manual, Copyright Linak 2007.

Office Details, Inc., Height AdjusTable Worksurfaces User Instructions, Copyright 2004 Office Details Inc.

* cited by examiner

HEIGHT ADJUSTABLE SUPPORT SURFACE AND SYSTEM FOR ENCOURAGING HUMAN MOVEMENT AND PROMOTING WELLNESS

CROSS-REFERENCE TO RELATED APPLICATIONS

This application is a continuation of U.S. patent application Ser. No. 15/285,939, filed Oct. 5, 2016, which is entitled "Height-Adjustable Support Surface and System for Encouraging Human Movement and Promoting Wellness," which is a continuation of U.S. Pat. No. 9,486,070, filed Sep. 25, 2013, which is entitled "Height-Adjustable Support Surface and System for Encouraging Human Movement and Promoting Wellness," which claims priority to U.S. provisional application Ser. No. 61/795,222, filed Oct. 10, 2012, entitled "Height-Adjustable Support Surface and System for Encouraging Human Movement and Promoting Wellness". This application claims priority to and incorporates by reference in its entirety each of the applications and patent referenced above.

BACKGROUND OF THE DISCLOSURE

The present invention generally relates to devices and systems for benefiting the health and efficiency of workers in a workplace, and more particularly, to height-adjustable support surfaces and other devices to encourage health-benefiting movement by the worker.

It is well known that the human body is designed to move and that we do benefit from regular and frequent motion throughout all our activities during each day. The efficiency and health of our circulatory system and our digestive system relies on almost constant movement throughout the day and night—even during our sleep. If a person sits in a chair at a desk for prolonged periods of time without stretching or standing his head will tend to lean forward naturally to try to maintain core balance, which will cause a muscle tone imbalance between the front and rear sides of the body. This results in a high risk of an increase of spinal shrinkage and an increase of intra-disc pressure within the user's spine. This can lead to muscle strain, muscle compression, nerve compression, tendon injury and ligament sprain at the shoulder, the neck, the upper limbs, and the back. This can further result in general musculoskeletal discomfort in the short term and more chronic upper and lower back pain and nerve-damage symptoms in the shoulder, the neck, arms and throughout the back (called: "repetitive strain injury") in the long term. Other health problems linked to a person regularly sitting for long periods of time include the blocking of the returning flow of venous blood causing blood to accumulate in the legs, in particular in the calves and ankles. Continued strain to such blood vessels will often lead to food edema, muscular discomfort in the legs, and varicosity.

Regardless of the specific injury that may result from sitting for extended periods of time, there is general consensus among physicians and ergonomists that there are clear health benefits to a person who breaks up their day with both periods of standing and periods of sitting at regular intervals.

For over two decades, a number of studies support this. For example, a study by Paul and Helander (1995) found office workers with sedentary jobs showing significantly more spinal shrinkage throughout the day compared to those with less sedentary jobs. They also compared spinal shrinkage with office workers who stood in thirty minute sessions with those who stood for fifteen minute periods. When the spine of each of these test subject workers was measured there was considerably less shrinkage in those who stood for thirty minute intervals. Also, workers in the test that had spinal disorders prior to the test showed a greater variability in the shrinkage pattern.

Another study by Winkle and Oxenburgh (1990) determined the benefits of providing active breaks (standing/moving) versus passive rest breaks (sitting) from the point of view of maintaining the health of muscles and the health of the spine. They found that alternating between sitting and standing was the most effective way to maintain a productive workflow and a healthy spine. The posterior wall of the inter-vertebral disc sustains cumulative degenerative changes when exposed to prolonged periods of high intra-disc pressure associated with flexed or semi-flexed seated postures. In other words, if you sit for long periods of time, you will be more likely to impart stress on your spine and, as a result, be uncomfortable. If you sit and then stand at regular intervals, you will not impart as much stress on your spine.

Nerhood and Thomson (1994) studied the introduction of sit-stand workstations at United Parcel Service (UPS). Results showed workers averaged 3.6 adjustments to standing position per day and spent an average 23% of the time per day in a standing position. They found body discomfort decreased by an average of 62% and the occurrence of injuries and illnesses decreased by more than half.

Unfortunately for their health, a typical office worker is forced to spend most of their day working in an environment that demands very little body movement. Sitting in a chair at a desk for hours at a time is not uncommon here and quite often the only movement such a worker will experience while at work will stem from the rapid, albeit slight movement of their fingers, hands and wrists as they operate their computers and phones while "comfortably" seated. A typical worker will not only sit most of their day while at work, but also will sit during their commute between work and home and also when eating their lunch. This may lead to them being in a seated position for upwards to 9-11 hours each day, and often for long uninterrupted periods of time.

This health concern was addressed decades ago with the introduction of a so-called "Sit-Stand" desk—an electrically-powered desk whose working surface can be power-raised and lowered as desired by the user. Unfortunately, these early electric sit-stand desks were cost prohibitive and not sufficiently commercially attractive for most companies to adopt. Eventually however, these powered desks did find their way into the workplace in limited quantities to a select few companies, such as high-end design firms and law firms.

A major problem with the early sit-stand desks and even those currently available today is that they lack intelligence. Yes, they can move up and down and up again, but only when commanded to do so by the user. Human nature prevails rather quickly and soon after the initial novelty and fun wears off of having such a "cool" desk, the user either forgets to raise or lower their desk at regular intervals throughout the day or simply loses interest, typically ending up sitting the whole day, once again. Therefore in short time, the very expensive high-tech sit-stand desk becomes just a sit-desk, and apart from the cost, essentially no different from the very desks it just replaced.

This problem was addressed to some degree in US Patent Publication No.: 2008/0245279 of Chun Ming Pan, published Oct. 9, 2008, now abandoned and also U.S. Pat. No. 5,323,695 of Borgman et al. Both of these patent references disclose height-adjustable workstations (so-called "sit-stand desks") that have a working platform (a top) that can be selectively raised and lowered as desired by the user in a manual mode, and also raised and lowered automatically at predetermined intervals. The devices disclosed in these references do allow for a reminder to the user to sit and stand regularly, but the devices are still considered basic in operation and lack intelligent operational software Like prior art height-adjustable workstations, these workstations do not "read" biometrics of the user or take into account other environment conditions that can provide specific and meaningful data. Such data would enable the up-down schedule of the height-adjustable workstation to adapt to the user, both throughout the day and over time.

Applicants of the present application understand that the user's fitness and habits will invariably change over time. Furthermore, Applicants of the present application have recognized a need for a "smart" height-adjustable workstation that responds to user-changes and other conditions and parameters by adapting or modifying its operation accordingly.

It is therefore a first object of the invention to overcome the deficiencies of the prior art.

It is another object of the invention to provide a useful, affordable power-assisted sit-stand desk that encourages and motivates regular use.

It is another object of the invention to provide such a power-assisted sit-stand desk that is able to measure or otherwise detect select biometrics of the user to help control current and future operation and functions.

It is another object of the invention to provide such a power-assisted sit-stand desk that senses and collects user data over time and communicates the same to a local display and to a second location for secondary use.

It is another object of the invention to provide such a power-assisted sit-stand desk that controls its operation in response to the detection of a user's presence.

It is another object of the invention to provide such a power-assisted sit-stand desk that controls operation in response to detection of sound within the immediate area of the desk.

It is another object of the invention to provide such a power-assisted sit-stand desk that allows height control in response to a single touch command by the user.

SUMMARY OF THE DISCLOSURE

A sit/stand workstation includes a worktop that has a powered drive and is moveable between a sitting height and a standing height. An electronic controller offers a user different operating modes, each with varying levels of automation. In one such mode, the user inputs a value that represents a desired percentage of standing time over a given period of time. The controller then uses user-profile information and the inputted value to create an initial custom height-adjustment schedule for the user. During use, the controller moves the worktop up and down following the schedule and uses sensors, such as a pressure mat, to detect how well the user follows the schedule and biometric indicators that convey fatigue and also energy. In response to this monitored user-information, the controller changes time, duration, and/or frequency of the schedule to better meet the abilities and fitness of the user and also to help encourage the user to continue regular use. Sounds, voice, lights, colors, and numerical information, as well as displacement of the worktop are used to help encourage the user.

BRIEF DESCRIPTION OF THE SEVERAL VIEWS OF THE DRAWINGS

The invention can be more fully understood from the following detailed description taken in conjunction with the accompanying drawings, in which.

DETAILED DESCRIPTION OF THE DISCLOSURE

Figure 1:
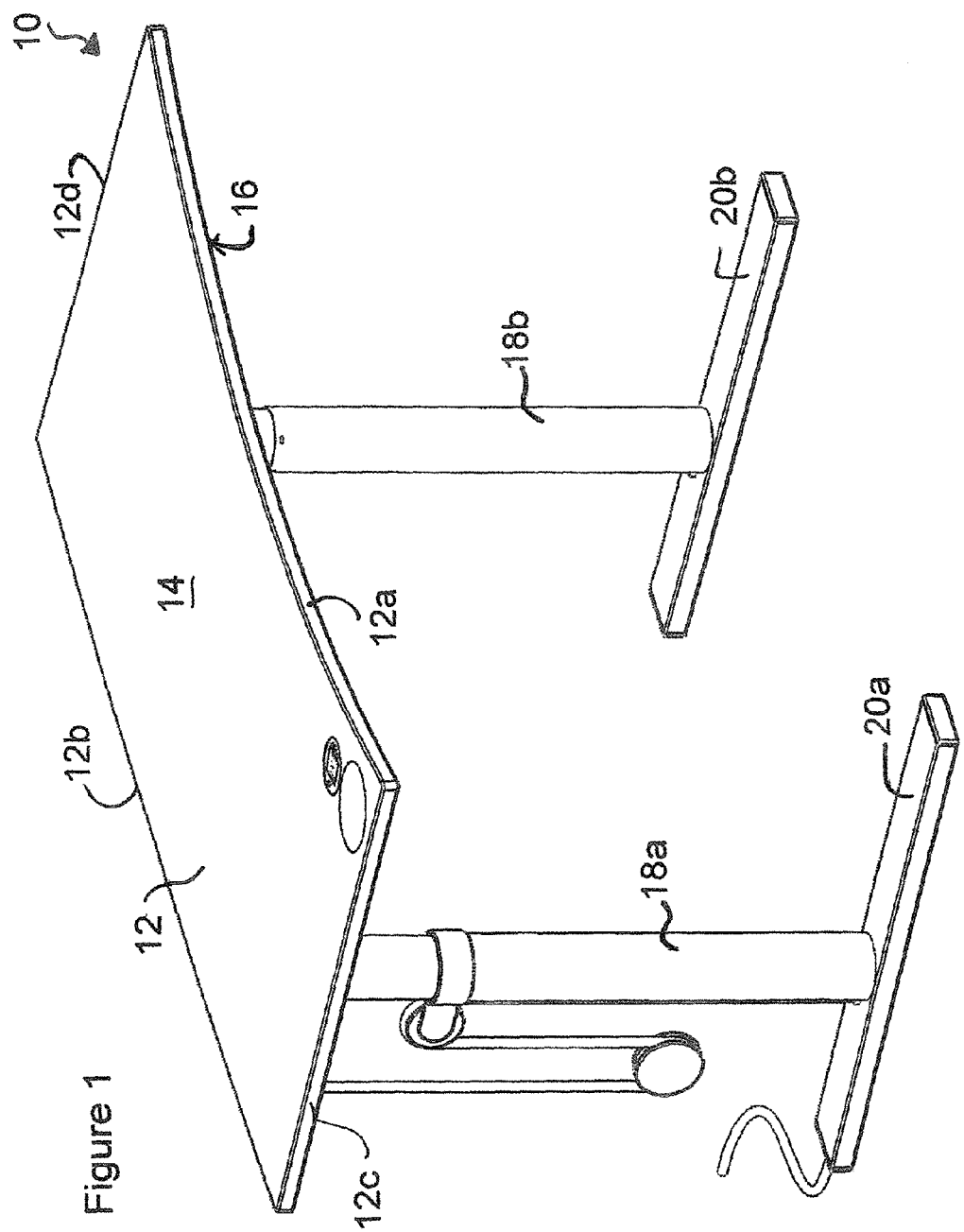
FIG. 1 is a front perspective view of a sit-stand workstation, according to the invention including a frame structure having two vertically displaceable legs each of which being attached to a base at a lower end and attached to a common support at an opposing upper end, a control unit and a power cord system, the desk shown in a lowered position.
Figure 2:
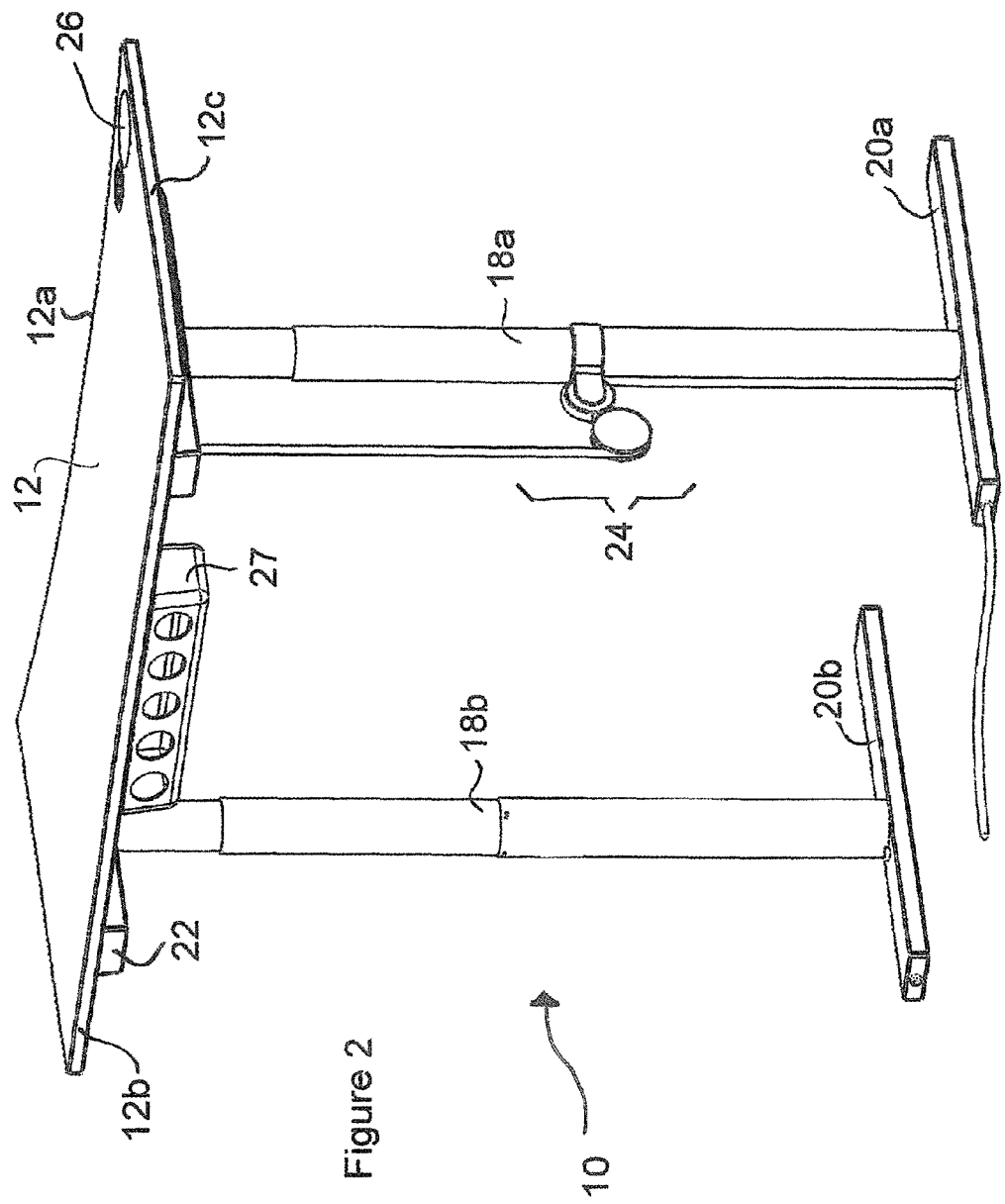
FIG. 2 is a rear perspective view of the sit-stand workstation of FIG. 1, shown in a raised position and showing a cord management box, according to the invention.
Figure 3:
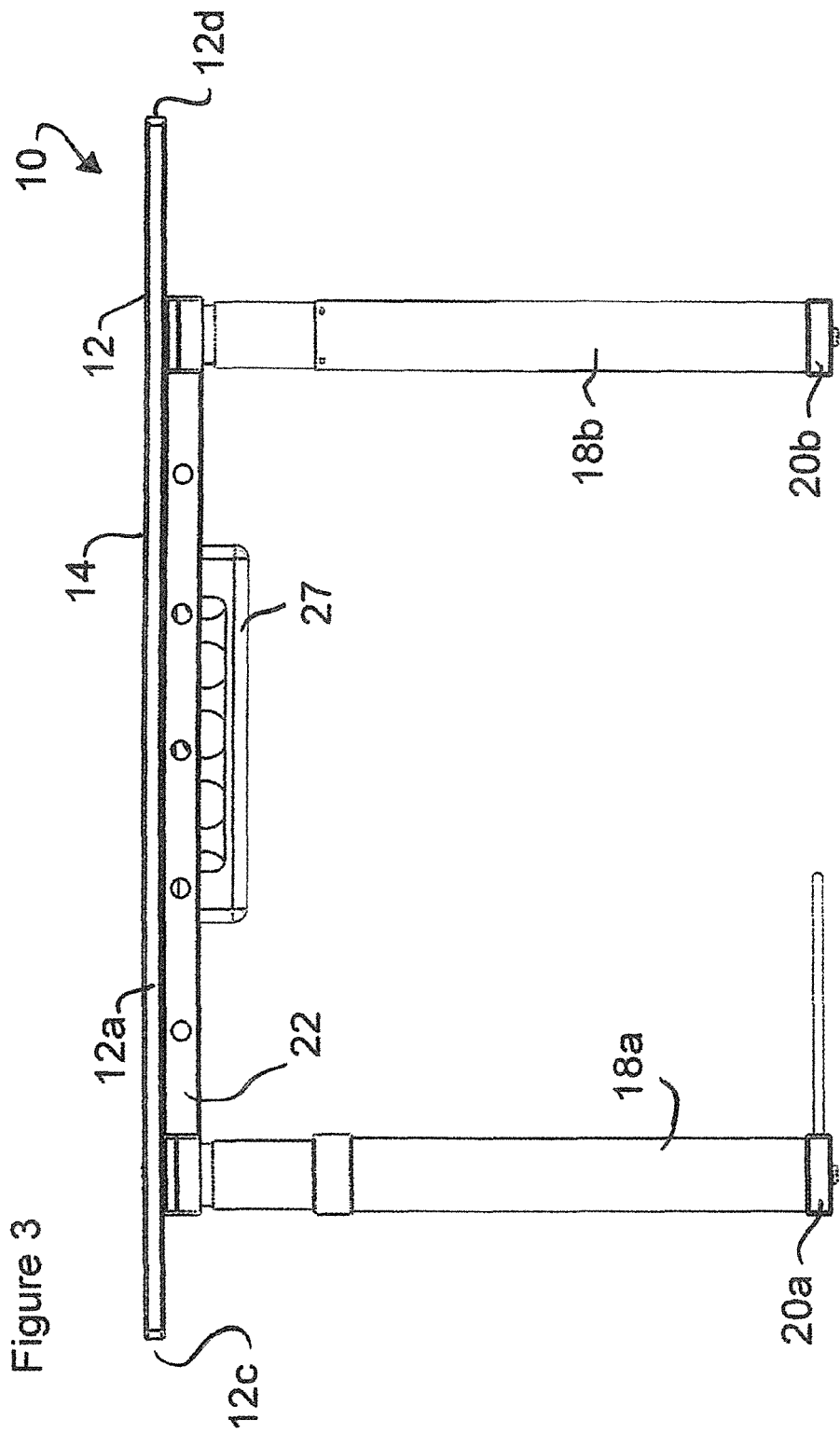
FIG. 3 is a front elevation view of the sit-stand workstation of FIG. 1 shown in a lowered position, according to the invention.

Workstation Structure:

Referring to FIGS. 1, 2, 3, 4 and 5, a height-adjustable workstation 10 is shown in accordance to the invention. The workstation is shown in a lowered position in FIGS. 1, 3, and 4 and in a raised position in FIGS. 2 and 5. The term "workstation" refers to a desk or a table or any other structure that includes a work surface or otherwise supports a machine or device, and can be of any size or shape without departing from the invention, described below. According to this preferred embodiment, workstation 10 includes a panel-like planar worktop 12, defining a work surface 14 and an underside 16, a lower support frame that includes two supporting pedestals 18a, 18b and two bases 20a and 20b, an upper support frame 22, a cord tensioning assembly 24, a control unit 26 and wire management box 27.

Worktop 12 includes a front edge 12a, a rear edge 12b, a left side edge 12c and a right side edge 12d. Worktop 12 can be any size and shape and made from any appropriate strong and rigid material, such as wood, metal, glass, particle board, Medium Density Fiberboard (MDF), High Density Fiberboard (HDF), reinforced plastic, or reinforced composites and laminates, or combinations thereof, as is well known by those skilled in the art. Since worktop 12 is meant to be raised and lowered at regular intervals, as described below, it is preferably made from a lightweight, rigid material with a durable work surface 14. As mentioned above, worktop 12 can take on any shape, but as shown and described in this application is preferably generally rectangular between about 4 feet and 6 feet long (measured between side edges 12c and 12d) and between about 26 and 36 inches deep (as measured along either side edge 12c or 12d). In this application, front edge 12a is shown curved inwardly to accommodate the user.

Figure 7:
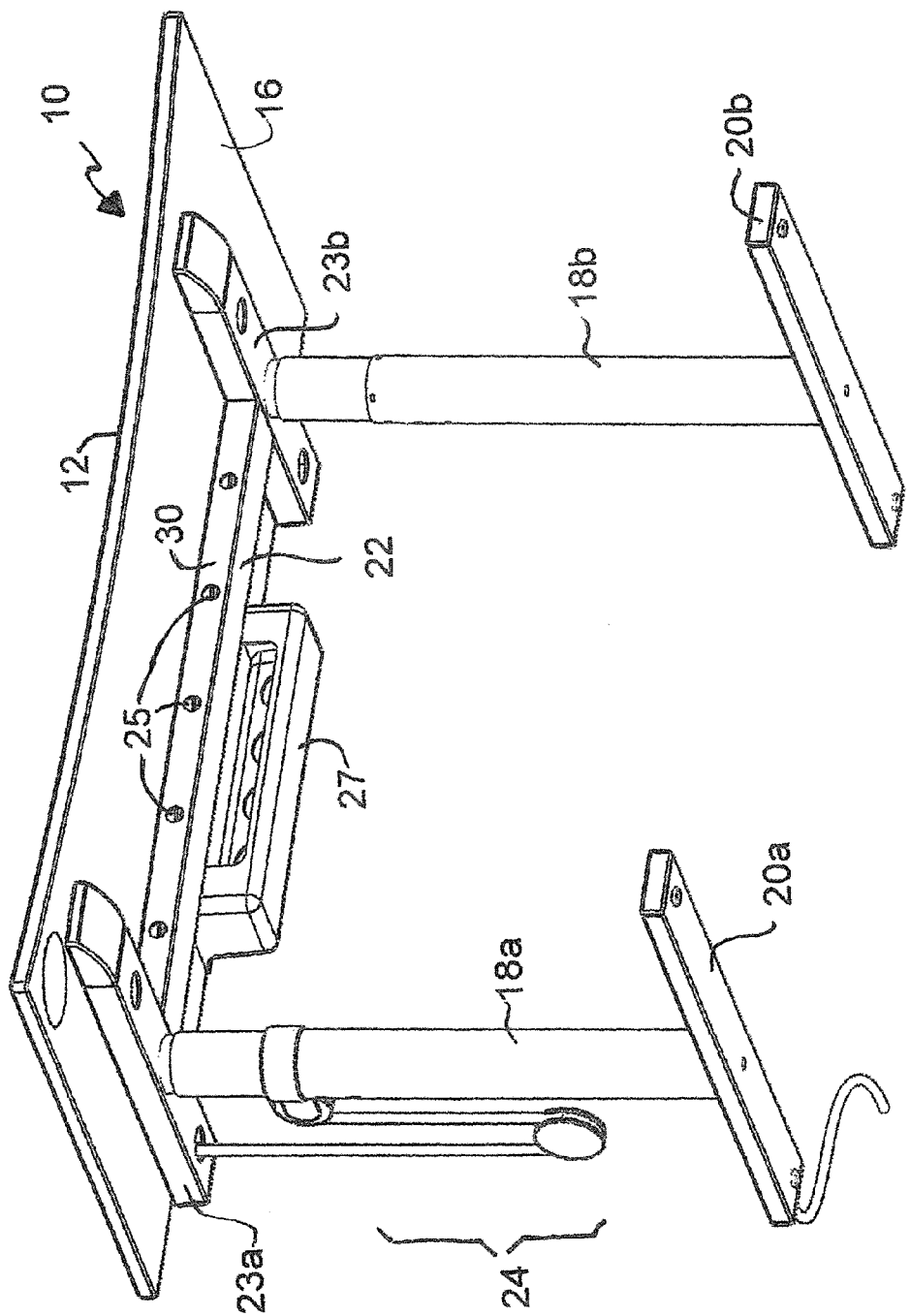
FIG. 7 is a lower perspective view of the sit-stand workstation of FIG. 1 shown in a lowered position, according to the invention.
Figure 8:
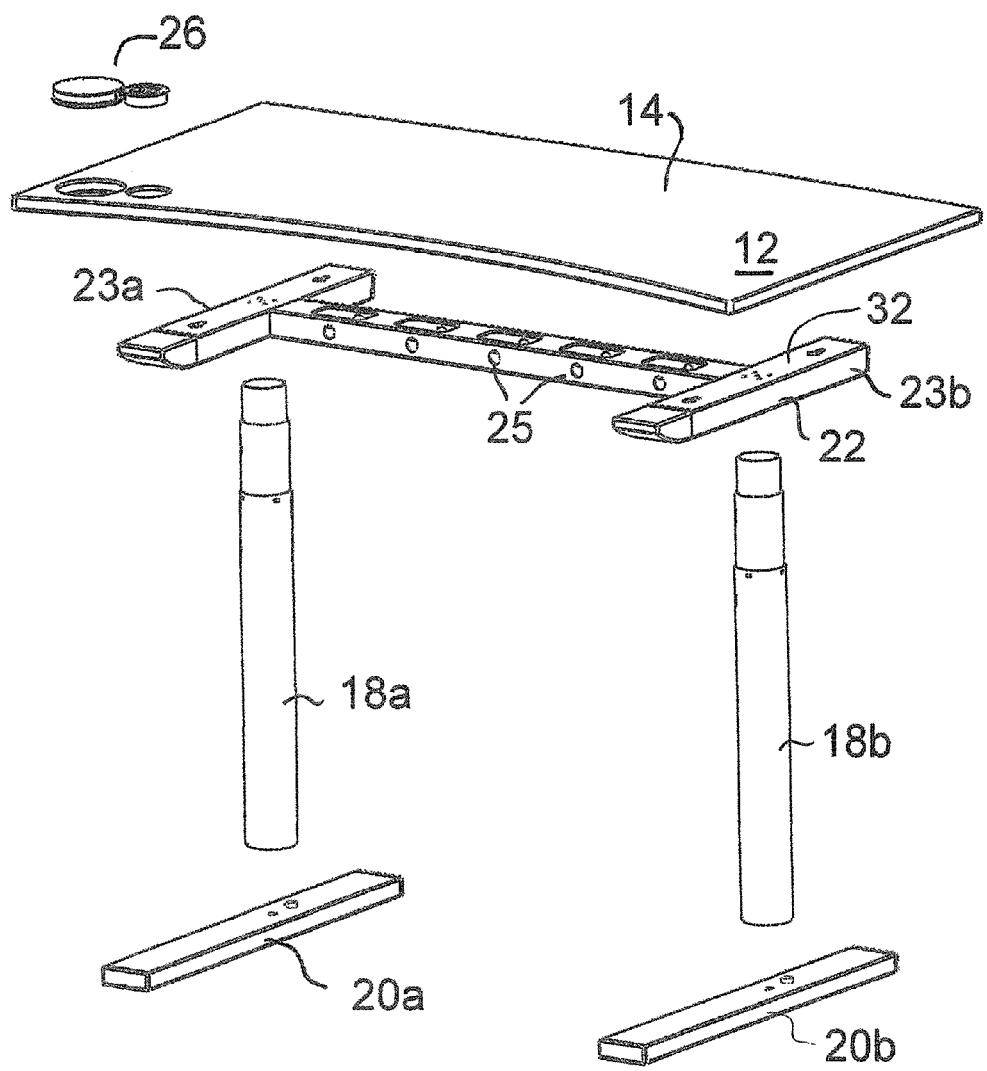
FIG. 8 is an upper perspective assembly view of the sit-stand workstation of FIG. 1, according to the invention.
Figure 9:
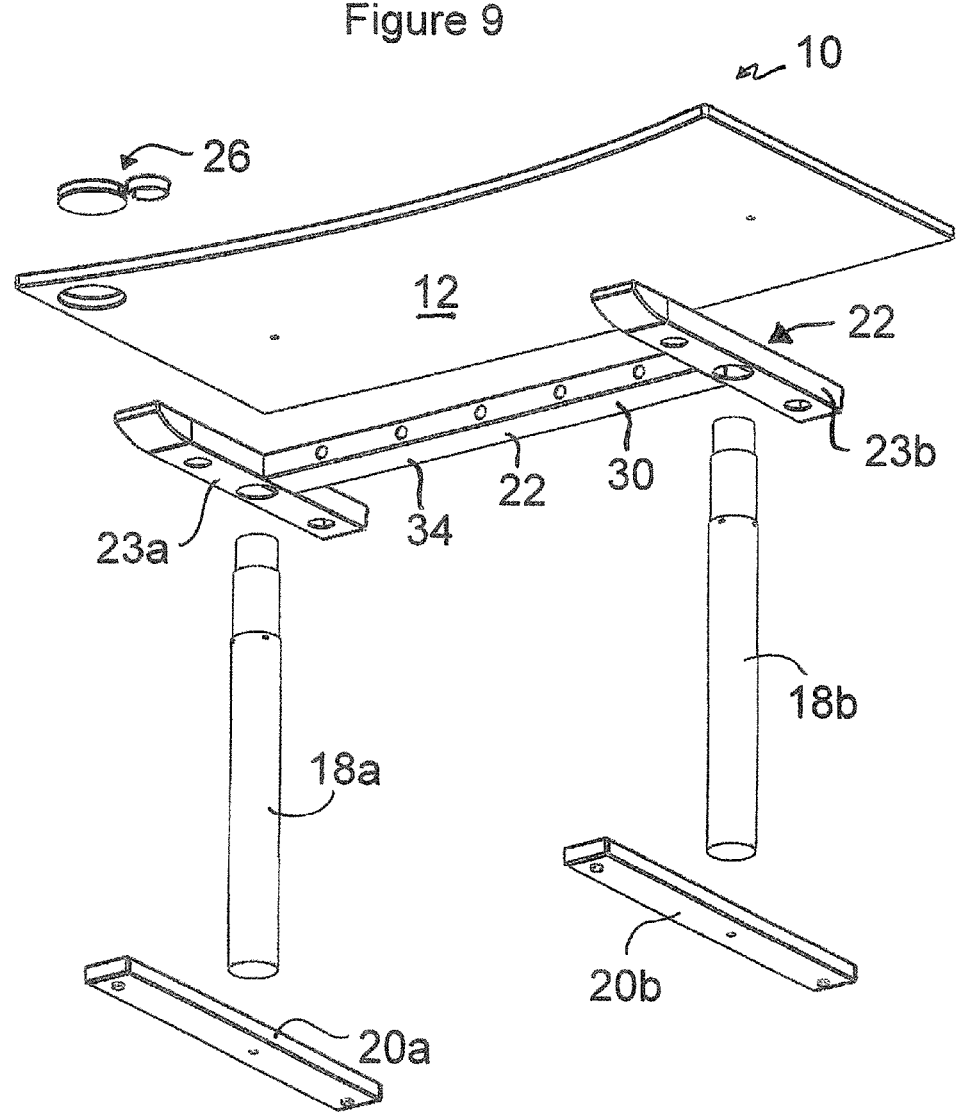
FIG. 9 is a lower perspective assembly view of the sit-stand workstation of FIG. 8, according to the invention.

Upper support frame 22 may be of any shape, but is preferably "H" shaped, as shown in FIGS. 7, 8, and 9, and includes two side sections 23a, 23b, connected to a central crossbar 30. These three parts are preferably hollow-box-formed and made from steel or aluminum. Each part is welded to each other to form a structurally rigid single body and defines an upper frame surface 32 and a lower frame surface 34. As described below, upper support frame 22 is connected to pedestals 18a, 18b and provides a rigid connection between the two and also provides a connecting platform to which the worktop 12 can be secured. Upper support frame 22 is preferably made hollow and includes a multitude of wire ports 25 through which various wires and cords may selectively pass between wire management box 27 (not shown in FIGS. 8 and 9, but shown in FIG. 7) and various electrical devices used either on the work surface 14 or in the immediate area.

Each pedestal 18a, 18b is preferably of the type that includes two or more vertically telescoping tubular sections and are each designed to selectively collapse and extend linearly between a lowest height, preferably about 20 inches, and a highest height, preferably about 48 inches. At least one, but preferably both pedestals 18a, 18b includes a drive mechanism (not shown). The drive mechanism is preferably located within the pedestal structure and can be electronically and accurately driven to control the exact magnitude of linear displacement (extension or retraction), and therefore the exact height of worktop 12, as measured between the floor and work surface 14. The drive mechanism preferable includes an electric motor (not shown) connected to a lead screw (not shown) wherein the lead screw engages a threaded follower. The follower is mechanically secured to a rigid portion of the pedestal structure so that as the motor rotates the lead screw, the follower is forced along the lead screw and in turn, causes linear displacement of the pedestal, as dictated by the sliding telescoping components of the pedestal.

Although the above arrangement is preferred, other mechanisms may be employed to raise and lower the work surface 14, as those of ordinary skill in the art are well aware, including a system of pulleys and cables, toothed belts, and/or appropriate bar linkages (e.g., four-bar linkages). Each of these systems may be used to effectively mechanically linearly displace each pedestal 18a, 18b, as instructed. Instead of an electrical drive motor, the linear drive mechanism for linearly displacing the pedestals may alternatively be derived from an appropriate pneumatic or hydraulic drive system or a magnetic linear motor, as understood by those skilled in the art. Appropriate linear drive systems for pedestals 18a, 18b are commercially available by several companies, such as: Joyce/Dayton Corp. of Kettering, Ohio. Regardless of the drive mechanism used, the drive mechanism is able to selectively raise and lower worktop 12 with respect to the lower frame (and the floor).

Referring to FIGS. 8 and 9, and regardless of the type of drive mechanism used to control the linear displacement of each pedestal, a lower end 19a, 19b (usually the telescoping section of largest diameter) of each pedestal 18a, 18b, is mechanically secured to base 20a, 20b and an upper end 21a, 21b is mechanically secured to upper support frame 22 using appropriate mechanical fastening means, such as bolts, welding, brazing, or friction (such as mechanical clamps), or a combination thereof, as long as the end result is that the each pedestal 18a, 18b is firmly mechanically affixed to both base 20a, 20b and upper support frame 22 to create a stable and strong structure. Although not shown, depending on the material and structural details of the different components of work station 10 a cross bar may be required to ensure a sturdy rigid structure that mitigates racking, listing and side-to-side wobbling.

Worktop 12 is secured to an upper side of upper support frame 22 using any appropriate fastening means, such as screws, bolts, rivets, adhesive or an appropriate mechanical friction means, such as clamping, so that underside 16 of worktop 12 contacts upper support frame 22 and so that worktop 12 becomes firmly affixed to upper frame surface 32 of upper support frame 22.

Bases 20a, 20b, pedestals 18a, 18b, and upper support frame 22 are all preferably made from a strong rigid material, such as steel or aluminum, but other materials can be used for all or some of these components, including wood, other metals and metal alloys, composites, plastics, and even the use of glass is contemplated.

Figure 10:
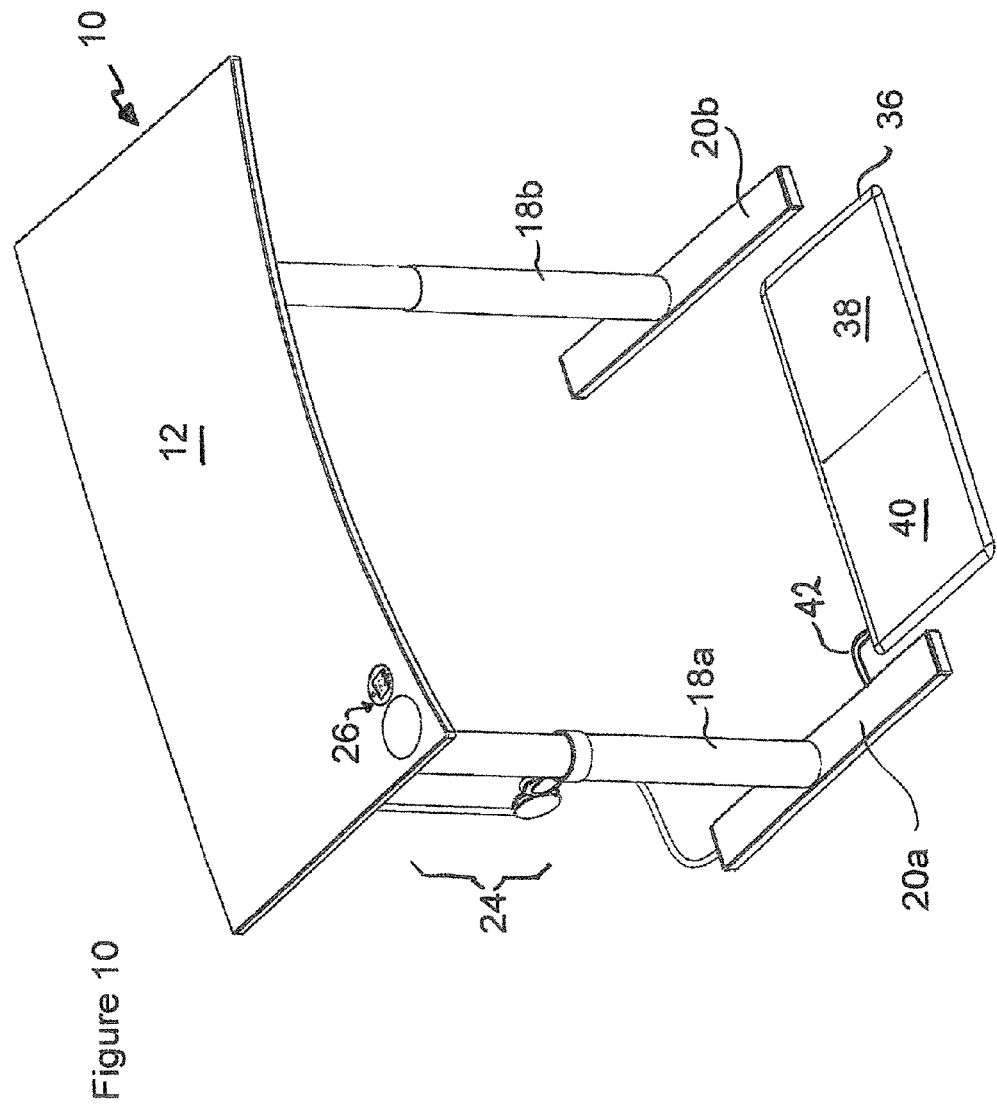
FIG. 10 is a perspective view of the sit-stand workstation of FIG. 1 showing a pressure mat, according to another embodiment of the invention.
Figure 11:
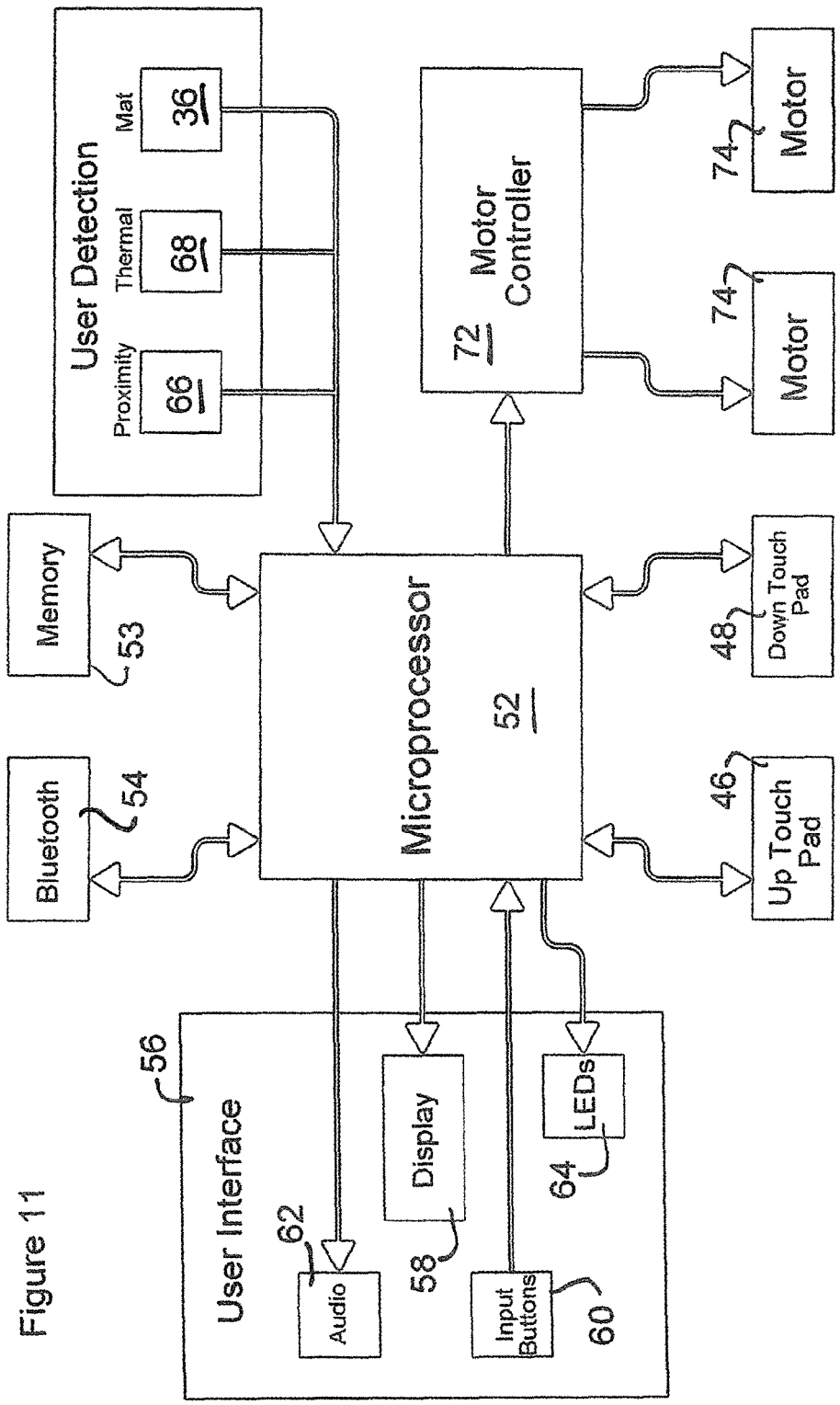
FIG. 11 is an electrical system schematic showing details of a control unit and peripheral sensors and devices, in accordance with the present invention.

Referring to FIG. 10, work station 10 is shown according to another embodiment of the invention wherein a pressure-sensitive mat 36 is provided, positioned on the floor in front of work station 10 and between bases 20a, 20b. Mat 36 includes appropriate circuitry (or other internal structure) to detect and measure isolated pressure within predetermined zones, preferably a right pressure zone 38 and a left pressure zone 40, but other zones are contemplated. The circuitry used within mat 36 is preferably a simple and reliable circuit, such as a strain-gauge system commonly used within conventional electronic scales or even within the floor step-unit of a Wii gaming system, or the pressure mats used to operate the automatic door-opening mechanisms of a grocery store. Mat 36 is electrically connected to control unit 26, either directly using electrical cord 42, or wirelessly using a wireless system (transmitter and receiver), such as Blue-Tooth®, other RF, or infrared. Mat 36 is used to detect and measure the following, according to the invention:

a) If a person is located in front of workstation 10;
    b) If that person is standing;
    c) If that person is sitting;
    d) The weight of that person (used to track the person's weight and also can be used as a user identifier); and
    e) Fatigue, by detecting repeated and more frequent weight shift from one foot or zone to the other.

Applicants further contemplate using mat 36 as an input device to help the user communicate to workstation 10, perhaps to raise or lower the work surface 14, or perhaps to cancel a planned height-change event, or to allow the user to perform a bit of exercise while standing, similar in concept to the Wii gaming system.

Also, mat 36 can include transducers (not shown) that would generate mechanical vibration in response to received signals sent to mat 36 from control unit 26 as a means for workstation 10 to communicate to or alert the user. Mat 36 is preferably made from a strong durable material, such as plastic, or rubber or composite and is powered by on-board batteries, or powered from a power unit located within workstation 10. Such mats are well known and the specific internal construction and internal operational details are beyond the scope of this invention. A well-known example of a pressure sensitive mat switch is commonly used at grocery stores to detect the presence of a customer entering or exiting and to then activate a motor-drive unit to automatically open the door.

Control Unit:

According to the present invention and referring to FIGS. 6, 8, 9 and 11, control unit 26 is shown including a display and input unit 44, an upper touch pad 46 and a lower touch pad 48. Control unit 26 preferably includes a control circuit 50 having a microprocessor 52, memory 53, a Blue-Tooth® module 54, and a user interface 56. User interface includes a display 58, such as an LCD display, input switches 60, an audio circuit 62 and status LED lights 64, all electrically connected to microprocessor 52 in a manner to provide the desired operation in accordance to the present invention, as explained below. User-detection transponders, such as an ultrasonic range finder 66, a thermopile 68, pressure mat 36 (shown in FIG. 10 and described above), and a microphone 70 are electrically connected to control circuit 50 so that electrical input signals from these remote transponders can be considered during operational decisions of work station 10, as explained below. Electrical connection of the above described components of control unit 26 are well known by those of ordinary skill in the art and are therefore not described in any great detail here.

A motor control circuit 72 is used to drive each drive motor 74 in response to electrical command signals from the connected control circuit 50, as described below. Motor control circuit 72 may be located within each respective pedestal, 18*a*, 18*b*, adjacent to each motor located therein. As explained above, drive motors 74 are used to raise and lower work surface 14, as needed. Control circuit 50 further includes various connectors that allow peripheral and other devices to be hard-wire connected to control circuit 50 and therefore to microprocessor 52, as desired or as necessary for proper operation.

As mentioned above, user interface includes display 58, input switches 60, an audio circuit 62 and status LED lights 64. Display 58 functions to communicate to the user both alphanumerical data and visual data during use of workstation 10. In accordance with the present invention, display 58 preferably changes background color to help convey certain information regarding the operation of workstation 10, the performance of the user, or to provide psychological encouragement or concern, depending on the on-going performance of the user. For example, if the user is on target or within 5% of meeting his or her goals for time standing, then display 58 will appear green. Following this example, a yellow color showing on display 58 will indicate a slight departure from the height-management schedule and a red color could show for a short period of time if and when a particular scheduled raising event is cancelled by the user. Display 58, according to the invention is also used to indicate various numerical information during the setup and operation of workstation 10, such as any inputted data including the user's weight, height and age, the date, the time, etc., and various operational data, such as current height of the work surface, current time and date, and desired and current standing time in percentage or hours and minutes. Display 58 can also indicate an estimate of current calories burned for that day, calories burned for the month, etc. and even a rate of calorie-burn at any given time. For encouragement, Applicants contemplate calculating and displaying an equivalent "age number" as an estimate of improved health that the user would be considered equal to, a kind of representative fitness indicator. The number would be displayed automatically if the number shows a younger age than that of the user, and displayed by request regardless of the age.

Input switches (or buttons) 60 are used to allow the user to input information and control different functions and modes during the operation of workstation 10. Input switches 60 can be any conventional type electric switch, such as a simple momentary push-button membrane switch, a capacitive-controlled "touch-sensitive" contact switch, or even as an "on-screen" switch, provided within display 58 as a touch-screen input device. Regardless of the type of switches used, Applicants recognize the need of a sealed user interface to prevent or at least discourage dirt, dust, crumbs, or any liquids from reaching any internal circuitry of control unit 26.

According to one embodiment of the invention, at least two input switches are large capacitive-controlled "touch-sensitive" contact surface pads, a move-up lower touch pad 48 located on the underside 16 of worktop 12, and a move-down upper touch pad 46 located on work surface 14 of worktop 12. According to this embodiment, if a user just touches move-up lower touch pad 48 with his hand, the "switch" would "close" and this condition would be instantly detected by microprocessor 52 during routine interrogation, which would then immediately send a signal to motor control circuit 72, which would, in-turn, cause drive motors 74 to automatically activate to raise worktop 12. The fact that move-up lower touch pad 48 is located under worktop 12 allows the user's hand to move up with the table, giving the user a better sense of control since the user's hand rising with the table would effectively be lifting the table. This arrangement provides effective bio-feedback to the user. Similarly, having the move-down switch located on the top of the table allows the user's hand to move down with the table.

Applicants contemplate providing each up/down capacitive switches with an adjacent momentary pressure membrane switch. This arrangement, for example would allow the user to raise or lower the worktop 12 at a first speed just by lightly touching the capacitive switch and then selectively increase the rate of height displacement by pressing the same switch a bit harder so that the adjacent pressure membrane switch is activated. Control circuit 50 would be programmed to control the speed of the motors in response to the detected condition of both the capacitive switch and the pressure switch for both up and down directions. The switch can be in the form of a touch-screen wherein a graphic switch or similar can be displayed on the screen to convey a switch function. The user merely has to touch the screen on the switch graphic to effectively generate a "start" command, which is sent to the control circuit (the "start" command may not necessary be generated by the switch itself, but may instead be created within the control circuit in response to detecting that the switch has been activated—either moved to cause the worktop to move up or down or change speeds, as understood by those skilled in the art). Once the control circuit "receives" the start command, the control circuit sends a signal to motor control circuit 72, which would, in-turn, cause drive motors 74 to automatically activate to raise worktop 12.

One Touch Operation:

According to another embodiment of this invention, control circuit 50 and the controlling software program is such that the user only has to touch either the upper touch pad 46 or the lower touch pad 48 a single time to instruct the microprocessor 52 to activate drive motors 74 to move worktop 12 either up or down to a preset or predetermined height. In this arrangement, the user only has to touch the touch pad (46 or 48) a single time and then release (just a tap or a swipe with the finger or palm). This feature is unlike conventional sit-stand workstations of the prior art which require that the user hold the switch constantly for the motor to remain activated during the travel of the worktop to the desired height. The prior art workstations use this continuous hold-down requirement as a safety feature so that the worktop does not accidentally hit anything during its movement.

The pedestals of the present invention preferably include an automatic safety cutoff system which will automatically deactivate drive motors 74 instantly should any part of workstation 10 contact an obstruction during movement. Such a cutoff system can be Piezo-electric based, or based on IR proximity type sensors, or other type of sensors, as understood by those skilled in the art, as long as the sensors can detect or otherwise determine that a portion of workstation 10 may contact with or otherwise damage an object or injure a person during lowering and that in such instance, the lowering movement will either stop or not start to begin with. Also, this feature requires that the user preset the upper and lower height-stops so that the control circuit 50 knows when to stop displacement once activated. If worktop 12 is located at its lowest height, as preset by the user during initial setup, and the user touches touch pad (46 or 48), control circuit 50 will drive the motors to raise worktop 12 until it reaches the highest preset height. Similarly, if the user touches touch pad (46 or 48) again, worktop 12 will descend to the lowest preset height. Now, if worktop 12 is located at some intermediate height somewhere between the preset highest and lowest height-stops, then it is preferred that the single-touch feature not activate. In such instance it is preferred that the user manually raise or lower worktop 12 to either the highest or lowest preset height-stops to reactivate the single-touch feature. This is because the system won't know if the single touch command is meant to raise or lower the worktop. As an alternative here, instead of preventing the single-touch feature from operating if the worktop is located at an intermediate position, the control circuit 50 can display a confirmation request on display 58 before a height-displacement occurs, such as "Tap upper pad once to confirm to move up—Tap upper pad twice to confirm to move down" . . . or words to that effect.

According to another embodiment of the invention relating to the above-described single-touch feature, the user may touch upper touch pad 46 once, as before, to activate the drive motor and move the worktop up or down. If the worktop is located at the highest (preset) position, the single-touch input will cause the worktop to descend to a preset lower position, where the drive motor will automatically stop. If the worktop is located at the lowest (preset) position, the single-touch input will cause the worktop to ascend to a present higher position, again where the drive motor will automatically stop. If the worktop is located at any intermediate height (between the uppermost and lowermost preset positions) the user's single-touch command will cause the worktop to automatically ascend (by default) advancing towards the upper preset position. If the user really wanted the table to descend instead, he or she just taps the upper touch pad 46 once to stop the ascending worktop and once more to cause the worktop to reverse direction and descend to the lowermost position. In this arrangement, as the user taps the upper touch pad, the motor will follow the same pattern: first tap, go up, second tap, stop, third tap, go down, fourth tap, stop, fifth tap, go up, etc.

To prevent accidental activation of the motor drive, the single-touch-to-activate operation can actually be a quick double-touch (like the "double-click" of computer mouse buttons) or a prolonged single-touch (or some other pattern of touching) to prevent accidental motor activation. With a single touch operation, the user may find themselves accidentally touching the upper touch pad 46, which can prove to be annoying. The user may set up the tap-to-move feature to operate as follows:

a) Which direction will the worktop move when the touch pad is touched (up or down);

b) How many taps is required to activate the movement (what is the tap pattern—single tap, double tap, long duration tap, etc.); and c) Which touch pad is to be used in this mode, the upper touch pad 46, the lower touch pad 48, or both.

According to yet another embodiment of this invention relating to the above-described single-touch feature, the user may single-touch the upper touch pad 46 to cause the worktop 12 to auto-move down to the lower preset position and single-touch the lower touch pad 48 to cause the worktop 12 to auto-move up to the upper preset position. In this arrangement, the single-touch feature will work regardless of the height position of the worktop.

According to another embodiment of the invention, Applicants contemplate that control circuit 50 will recognize when a user touches both upper touch pad 46 and lower touch pad 48. This action can be used to cancel a height-displacement event, or cancel a mode or provide an input response to a selection request.

Status LED lights 64 are preferably provided to convey select operational information, such as confirmation of a switch event (confirming to the user that the control circuit has detected the activation of a particular switch), power on, and perhaps a blinking or brighter condition to indicate when the table top is in motion up or down.

Apart from the above-described mat 36 which, as described can be used to detect the immediate presence of a user, ultrasonic range finder 66, and a thermopile 68 (such as Passive Infrared—PR) can also be used to detect when a user is nearby. Such detection allows important features of the present workstation to function, including:

a) Only operating drive motors 74 when a user's presence is detected (a safety feature);

b) Driving drive motors 74 to allow worktop 12 to move quickly up and down as a greeting (and also as a reminder to use the sit/stand operation of workstation 10) when a user first arrives at the workstation, perhaps in the morning; and c) To only calculate stand-time by the user when the user is actually present at the workstation.

Microphone 70 (and voice-recognition circuitry) is preferably included with the present workstation 10 so that control circuit 50 is able to determine if the user is speaking, perhaps on the telephone, or with a colleague. If such determination is made, it is preferred that control circuit 50 will postpone any table top movement during this time. We don't want to surprise or otherwise bother or interrupt the user when it is likely that he or she is busy.

Microprocessor 52 is instructed by a software program stored in onboard read-only memory. According to the present invention, the software is written to control the work-height of the table top in one of the following modes described in the following paragraphs Manual Mode:

This mode simply controls the up-down operation in response to the manual instructions by the user. When the user commands it, the control circuitry responds, the motors are driven and the table top is repositioned until the user releases the up/down switch, or as described above, the motors will automatically reposition worktop 12 from the lowest height stop to the highest height stop without having the user to hold onto the upper touch pad 46, or the lower touch pad 48.

Semi Auto Mode:

This mode provides automatic operation of the table top. The user inputs (as a percentage) how much of the time of use of the sit/stand desk he or she wishes to stand. For example, during an 8 hour period of use, worktop 12 will be in the raised position 25% of the time, meaning that the user will be standing for 2 hours during that time. Control circuit 50 will provide a height-adjustment schedule for this time period so that the user will be asked to stand a total time of 2 hours (or 25%) over the 8 hour period. Of course the actual stand time will be divided up during the 8 hours and will preferably follow a predetermined or random schedule. In this mode, control circuit 50 will signal to the user that a height-adjustment event is imminent, but will not carry out the height-adjustment until the user confirms that he or she approves. The user therefore effectively remains aware of the height-adjustment events during the day, but can override any event by either not confirming at the time of an event, or by actively cancelling the particular event. The user remains in control, but control circuit 50 encourages the user to keep to the sit and stand schedule by reminding the user when each height-adjustment event should occur to meet the pre-established goal. When the user cancels an event or manually changes the height of the worktop, control circuit 50 will automatically adjust the remaining schedule to account for the user's override and ensure that the user meets the standing goal (in this example, 25%). Canceling a height-adjustment event is similar to using the "snooze" button to cancel an alarm. It does not cancel the mode. The control circuit will continue to remind the user of future height-adjustment events, as they come up. According to this semi auto mode, when the worktop is meant to displace vertically during a height-adjustment, the present system will prompt the user by a "whisperbreath" worktop movement, as described below and request permission. When the user senses this movement of the worktop, he or she will understand that it is time for a height-adjustment event and that the workstation is requesting permission to carry out the adjustment. The user can either accept or decline this request, as described above.

Full Auto Mode:

This mode moves worktop 12 up and down following a height-adjustment event schedule. The schedule in this mode can either be generated by the control unit, in response to some initial inputs by the user, or set up by the user entirely. During use in this mode, when an event is to take place, the control unit will alert the user that a height-adjustment is imminent (for example, by activating worktop in a "whisperbreath" movement, as described below). The user does not have to confirm or do anything. After a prescribed period of time (a few seconds), the control unit will send a "Start" command to activate the drive mechanism, to raise or lower the worktop, as scheduled. The user can, at any time, cancel the height-adjustment movement by contacting the touch pads 46, 48. If the user cancels the event prior to movement, then worktop will remain at the same height and the schedule will be updated to account for the cancelled event. If the user cancels the event during the event (when the worktop is moving, the movement will stop). The user can then contact the touch pads 46, 48 another time to return worktop to the start height prior to the event.

According to this full auto mode, when the worktop is meant to displace vertically during a height-adjustment, the present system will prompt the user. When the user senses this movement of the worktop, he or she will understand that a height-adjustment is imminent, unless he or she wishes to cancel the event.

Adaptive Operation:

In either full or semi auto modes, an important feature of the present system is that it will adapt to the behavior of the user so that future operation of the workstation will better match the user's fitness level. This will encourage continued use of the workstation and therefore, continued fitness and wellness.

For example, the user programs workstation 10 to be fully raised 40% of the time during a period of operation (a full work day for example). But during operation, control circuit 50 detects that the user is shifting his or her weight side to side at more frequent intervals, as detected by the right and left pressure zones 38, 40 of mat 36, or by other sensors. This can indicate that the user is getting tired standing. In response to this potential fatigue by the user, control circuit 50 adjusts the height-adjustment event schedule so that worktop 12 will only be fully raised perhaps 30% of the time, taking into account the shortened time remaining of the period of operation during the recalculation.

In this example, the workstation of the present invention learned and adapted to a changing user behavior, as detected by its sensors. During use, the user appeared to be getting tired at the set stand time of 40% so the present system automatically reduced the goal to 30% to better match the fitness of the user. The workstation, according to the present invention uses sensors and data to "get to know" its user and adapt accordingly. In the above example, perhaps control circuit 50 can change the duration that the table resides at the full up position from 60 minutes to 30 minutes so that the user will be less fatigued during each standing period. The duration for each full down condition can also be adjusted to better adapt to the user. Continuing with this example, should the user show more fatigue in the future, the present system will again reduce the standing time until a balance is found, wherein the extra work required by the user to stand matches the condition of the user. Once this balance is determined, the present system can establish a schedule that matches the user's ability and fitness and can slowly work with the user to improve the user's strength, fitness and wellness over time. Similarly, control circuit 50 can adjust the duty cycle of each event to more closely fit the user's ability. As the user of the above example improves their fitness over time, the present system will detect this and will again adapt, but this time by increasing the standing duration, decreasing the sitting duration, and perhaps increasing the frequency of height adjustment events.

The learning feature of the present invention also learns basic work habits of the user, such as when the user goes to lunch each day, when he or she arrives and when he or she leaves. The system, according to the present invention may confirm trends over longer periods of time regarding the user. For example, the user may appear to be a bit more tired on Mondays owing to the number of cancelled raising height-adjustment events (and other measured or sensed factors) and perhaps even the measured amount of time it takes the user to transition from sitting to standing. The controlling system of the present invention uses this information to adjust the height-adjustment event schedule accordingly so that the system works with the user's detected strength and endurance, during the day, the week, and over longer periods of time. Over time, while using the present workstation in this mode, the height-adjustment event schedule and user-prompts on the screen will work to encourage the user and/or modify the amount of time sitting to help achieve long-term health benefits.

Other considerations can be used to influence the duration and frequency of height-adjustment events during the time period. Such information, such as general profile information, including the user's age, weight, overall health and answers to such set-up questions as:

1) Are you a morning person?
2) Do you exercise in the morning?
3) Do you have any injuries?
4) Do you have a heart condition? How much do you weigh?
5) About how many miles do you walk each day? What do you eat for a typical lunch?
6) Do you eat breakfast?

Other considerations may include performance data gathered early on during the day. For example, if the user is asked to stand for a duration of 1 hour and after just 15 minutes control circuit 50 reads data from mat 36 and determines that the user is shifting their weight from one leg to the other at an increasing frequency, then control circuit 50 will re-evaluate the duration and the schedule will automatically change to accommodate the learned ability and apparent health of the user. The system is designed to learn over the short term and the long term the particulars and improvements of the user so that a height-adjustment schedule can be created to benefit the user over a long period of time. In the above example, the schedule would change to shorten the stand—duration and if the user response continues to convey signs of weakness or fatigue, the system will either suggest a lower total stand time (perhaps 20%), or will just automatically adjust the percentage regardless.

According to the invention, when control circuit 50 is set in either the above-described automatic or semi-automatic mode, the present system will automatically adapt to the particular user and will change the duration, the frequency of the height-adjustment events, and the total stand time over the period of use in response to the user's measured behavior, as they use the desk. As described elsewhere in this application, if the user shows fatigue, for example, by rocking side to side, alternating putting his or her weight on his or her left and right foot, the present system will detect this (using mat 36 or other sensors). When this fatigue is detected, control circuit 50 will change the parameters of the height-adjustment schedule to better fit the condition of the user. The present desk is meant to work with the user, nudging them along with encouragement to follow an adaptive sit—stand schedule to thereby maximize fitness and wellness. Examples of such user-behaviors include:

| Measured Behavior | Response to Behavior |
| --- | --- |
| Fatigue of User | Decrease Amount of Stand Time |
| Strength of User | Increase Amount of Stand Time |
| Patterns of Height-Change Event | Avoid those Times for Height-Change |
| User is Not Detected at Desk | Do Not Change Height of Desk |
| Downloaded Fitness Information | Adjust Stand Time Accordingly |

Overtime, the present system will better understand "who" the user really is, and based on these measured behaviors and other considerations, the present workstation can adapt its operation accordingly.

According to another embodiment of the present invention, external devices, such as cell phones, computers and exercise-monitoring devices can be connected, either wirelessly, or by electrical connection to the control unit. An example of an exercise-monitoring device is a Fitbit®, made by Fitbit, Inc. of San Francisco, Ca. 94105. This particular device measures various parameters by a user during their movement, including the number of steps taken, the number of miles walked, the number of stairs climbed, and an estimate of calories burned. This information can be downloaded to the present workstation and used to determine the measured behavior of the user so that the workstation can take this information into account when determining the height-adjustment schedule for the user for the day.

Whisperbreath Movement of Worktop:

As described above, in either the fully auto mode or the semi-auto mode, the user is notified by display 58 and/or by smooth, small up and down height-displacements of worktop 14. This smooth up and down motion of the worktop 14 is known to the Applicants as a "whisperbreath" movement and is an important feature of the present invention. The movement provides a means to communicate to the user of the workstation in a relatively calm and non-interrupting manner. The amplitude of vertical displacement and the frequency is preferably calculated to mimic the breathing amplitude and frequency of a relaxed human. This frequency has been determined to be about 16 cycles per minute and the preferred vertical displacement of worktop 14 is about 1 inch (measured from peak to valley).

According to a preferred embodiment of this invention, whenever a height-adjustment event is about to occur in the auto-mode, the worktop of the present workstation will perform a whisperbreath movement (gently moving up and down) to inform the user that the worktop is about to move. In the above-described semi-auto mode, this movement will be used to indicate to the user that the workstation is requesting permission (prompting the user) to make a height-adjustment and the user must authorize the movement by contacting the display panel with his or her hand, using the pre-established tactile gesture, such as a single or double tap, or perhaps a swipe. Although this whisperbreath movement is preferably used alone to prompt the user, as described above, this movement can be supplemented with a sound. Also, if the user ignores the gentle movement of the worktop 12, the frequency and amplitude can be changed by control circuit 50 to a less-than-peaceful movement to better get the user's attention.

Figure 12:
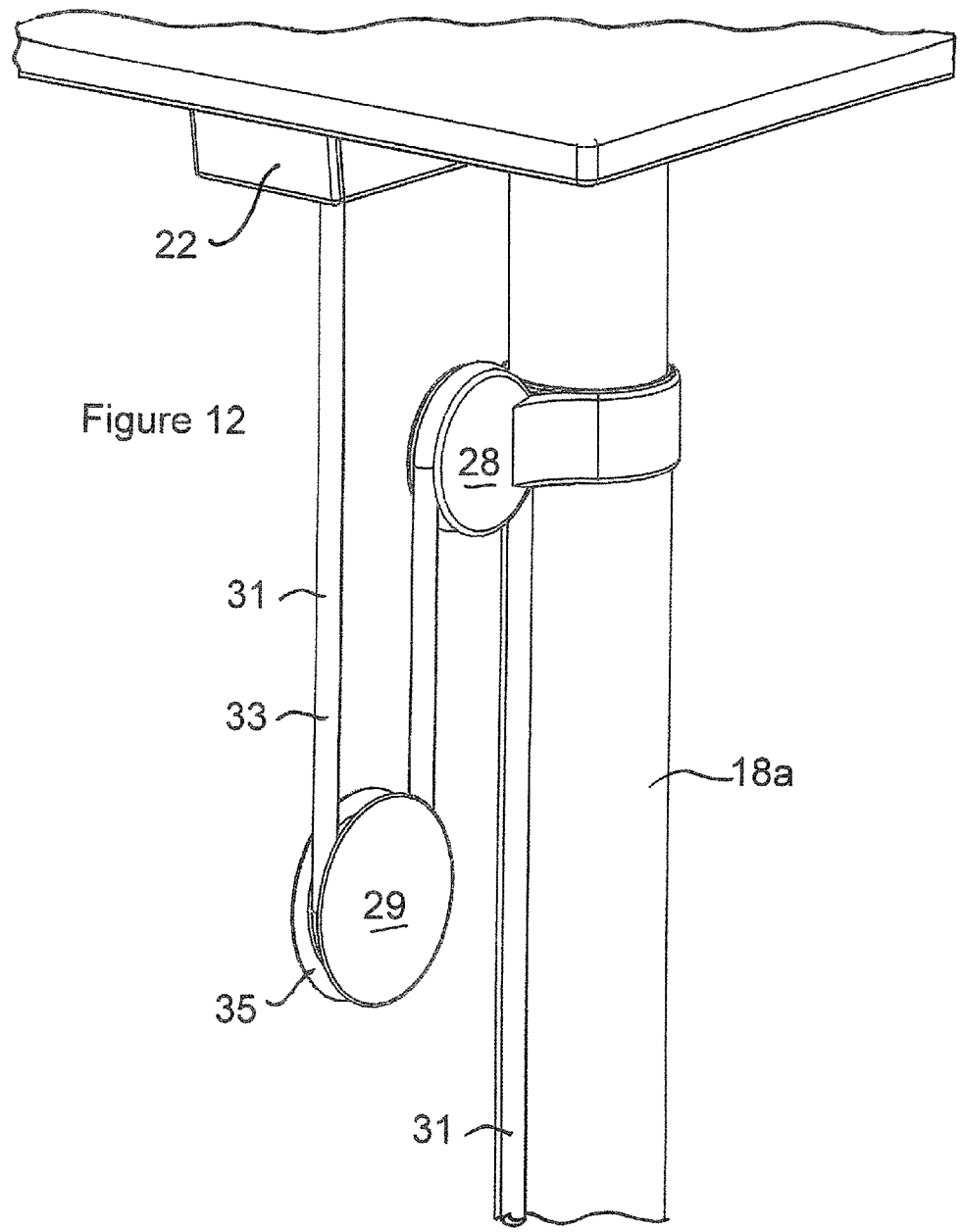
FIG. 12 is a perspective partial view of the sit-stand workstation of FIG. 1, showing details of a power-cord tensioning assembly, according to another embodiment of the invention.

Referring to FIG. 12, when the user receives workstation 10 for the first time and powers it up, workstation 10 will greet the user by the above-described whisperbreath movement of worktop 12. According to one embodiment of this feature, this greeting movement will be repeated once a day when the user first arrives, as detected by mat 36, proximity transducer or some other sensors. According to another embodiment, this same movement, or a similar one can be used to get the user's attention at any time during the period of use (e.g., during the day at the office). As mentioned above, the characteristics of this whisperbreath movement can vary so that more than one movement can be used to indicate different things. As mentioned above, a greeting movement can be relatively quick (almost indicating "happiness" to see the user). This movement can therefore have a relatively quick cycle time, perhaps moving up about ½ inch and then slowly down 1 inch and then quickly up 1 inch and finally slowly down ½ inch. Another unique movement can be described as moving up and down 1/10 inch very quickly, essentially a vibration. This quicker movement could perhaps be used to convey more urgent messages to the user. Another signature movement could be a single quick downward movement of perhaps ¼ inch. It is contemplated that the user's cell phone can be "connected" (by Bluetooth®, or other) to control circuit 50 and the alert movement of the desk can be used to alert the user of certain cell phone events, such as incoming call, email or text, etc. The desk movement can also be used in connection with software programs running on a nearby computer, such as Microsoft's Outlook®, wherein, for example, the movement can alert the user of an upcoming meeting. Other electronic devices can be connected to control unit 26 so that these devices may cause a whisperbreath movement to occur. Such devices include a smoke or fire alarm, a doorbell and a remote security device. For example, if a nearby smoke alarm is activated, a signal could be transmitted to the user's workstation to cause the worktop to alert the user by rapid movement of the worktop. Any amplitude or frequency or sequence can be used to create unique movements for any of a variety of alerts to the user. The general amplitude range for these dips is between about 1/16 inch to about 1 inch (measured peak-to-peak).

In use, during initial setup of workstation 10, according to one embodiment of the invention, the user is asked to answer several questions that appear on display 58 and also to input several bits of information, such as the use's age, date, time, the user's name, weight, height, build and other. The user will then be asked to manually raise worktop 12 to a height that the user considers to be a comfortable maximum height for standing. When the desired height is reached, the user holds lower touch pad 48 until control circuit 50 flashes status LED lights 64 and audio circuit 62 beeps (and perhaps the worktop whisperbreath movements). The user will repeat this process for setting the desired lowest worktop height (i.e., sitting)

Control circuit 50 will then continue the set up by asking the user to select a percentage-standing value, such as 25% so that later when "Semi Auto Mode" or "Full Auto Mode" are selected, workstation 10 can operate immediately under the predetermined guidelines of either of these two modes. The user will also have to input the average consecutive time spent at the workstation. These values can be adjusted either by the user, or automatically as control circuit 50 adapts to user conditions and user behavior patterns over time.

Applicants further contemplate an alternative set up process where after the user inputs the above-mentioned information, the user is encouraged to use workstation 10 in a manual mode for a period of time, perhaps a week. During this time, control circuit 50 will keep track of the different worktop heights, duration at those heights and frequency of height-adjustment event and then use this information to determine highest height stop, the lowest height stop, and a baseline health value. From this information, control circuit 50 can create a more accurate height-adjustment schedule when the user selects Full Auto Mode or Semi Auto Mode later on. The computer will know (eventually, as it learns) if the user is not very fit and will start a plan that is less strenuous to the user, offering perhaps a schedule that asks the user to stand 15% during the work day time period. The computer monitors how the user is able to handle this plan over the next week or two and then slowly increases the standing time and/or frequency of the sit-stand events. If the user starts overriding the automatic events set by the computer, either cancelling or extending the duration or frequency, the computer would detect this and make adjustments to the event schedule accordingly. Applicants recognize that an important feature here is to ensure that the user is not discouraged by using the present workstation according to the invention and follows the prescribed height-adjustment event schedule as closely as possible.

An important goal of the present invention is to provide a sit/stand desk (and other devices) that encourage a user to get fit and stay healthy. As mentioned above, the present invention uses sound, by sound effects and voice (words of encouragement, etc.), lights (different colors displayed on display 58 to convey different levels of success and encouragement), or numerically, by displaying a numerical value on display 58 to convey levels of success or honest levels of current health.

According to yet another embodiment of the invention, to encourage the new user to just get started, the workstation 10 is immediately operational and will automatically follow a preset level of standing time, such as 15%. The user will be able to "play" with the heights to adjust the preferred heights during initial use, when the user wants to. The control circuit 50 will keep track of all adjustments and will slowly fine-tune the user's operational parameters. The present workstation 10 will ask the user questions over a period of time, such as a week, including the use's age, date, time, the user's name, weight, height, build and other. This way, Applicants believe that because the user will not feel like there is a set up period and they can use the workstation immediately, they will feel better connected to the workstation with develop a feeling of trust and oneness, which can only encourage prolonged use of the workstation and a healthy outcome.

Figure 4:
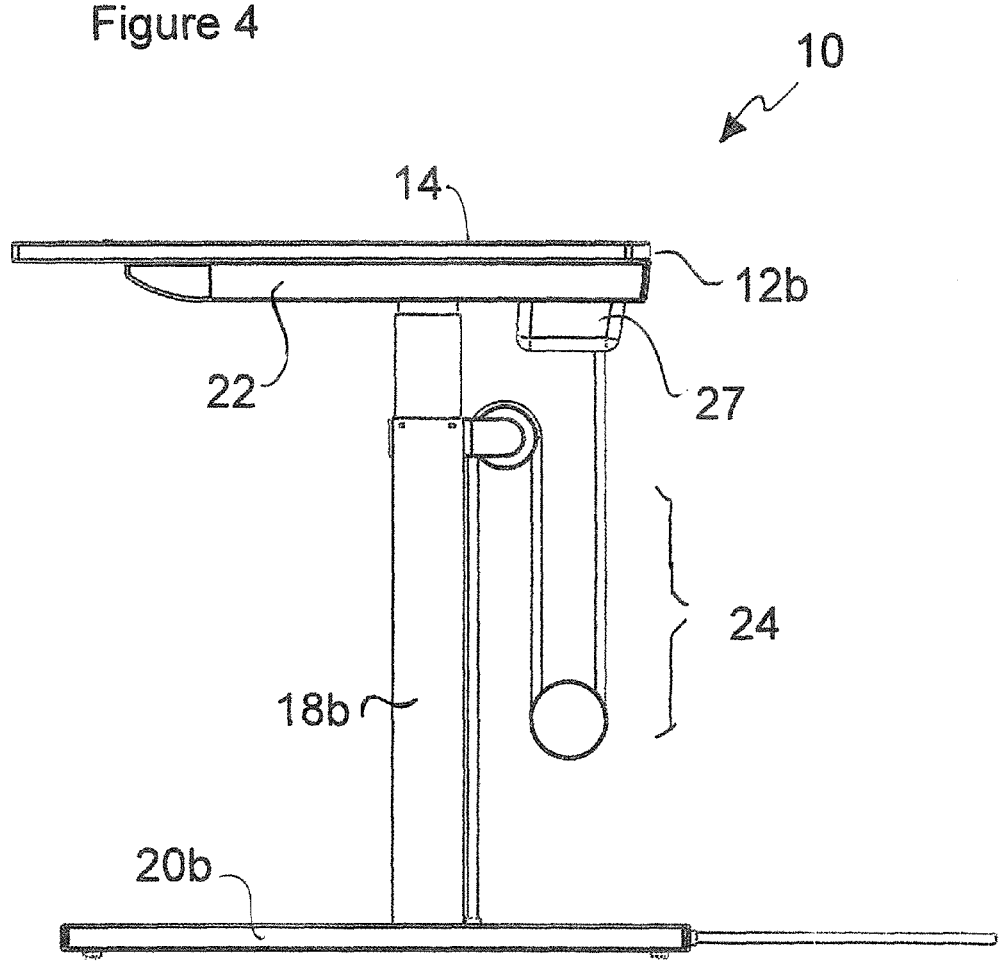
FIG. 4 is side elevation view of the sit-stand workstation of FIG. 1 shown in a lowered position, according to the invention.
Figure 5:
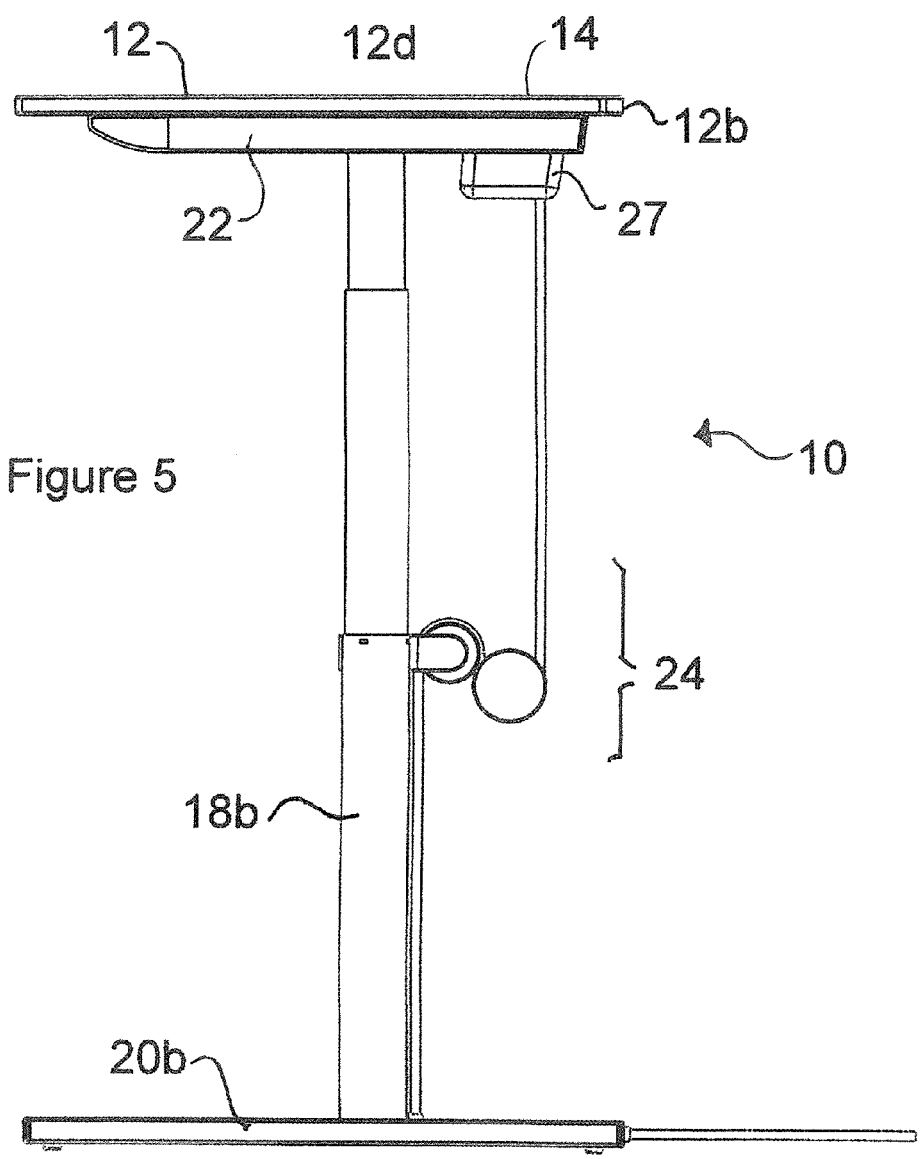
FIG. 5 is side elevation view of the sit-stand workstation of FIG. 1 shown in a raised position, according to the invention.
Figure 6:
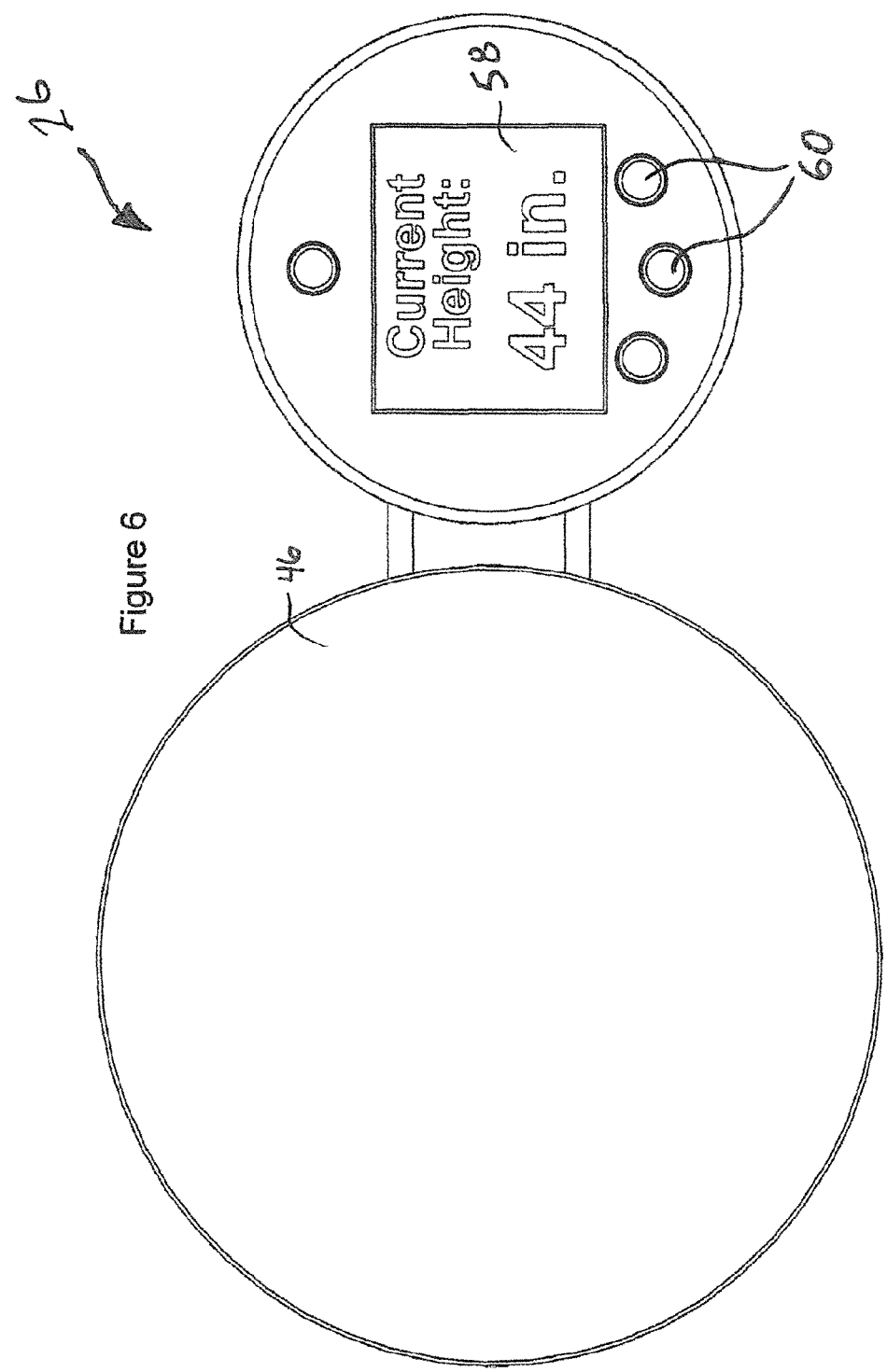
FIG. 6 is a top plan view of the control unit, showing an input contact pad and a display, according to the invention.

Wire Management:

Since work station 10 commonly supports electronic equipment on worktop 12, such as a computer and monitor, it is important to provide a source of power for such devices located on worktop 12. The challenge is to manage the power cable as it follows the worktop up and down during the operation of workstation 10. Referring to FIGS. 4 and 5 and according to a preferred embodiment of the invention, a cord tensioning assembly 24 is shown including a stationary pulley wheel 28 and a tensioning weight 29. Pulley wheel 28 is secured to either pedestal 18a, 18b (shown in the figures secured to pedestal 18a) at a portion that remains stationary with respect to base 20a as worktop 12 moves up and down during the operation of workstation 10. Pulley wheel 28 is preferably circular in shape, like a conventional pulley and includes a circumferential groove that is sized and shaped to receive a power cord 31. Pulley wheel 28 is preferably about 2-3 inches in diameter and is mounted to leg 18a so that the center of pulley wheel is located about 2 to 3 inches away from leg 18a.

As shown in FIGS. 4 and 5, and 12, power cord 31 is fed into either base 20a, 20b (shown fed into base 20a in the figures) and directed up to the groove of pulley wheel 28. According to the present invention, tensioning weight 29 is preferably pulley shaped and includes a groove 35 that is sized to receive power cord 31. Power cord 31 extends up to upper support frame 22 and is provided with slack so that a loop 33 is formed. As shown in FIGS. 4 and 5, tensioning weight 29 is positioned within this loop so that power cord 31 is effectively captured within groove 35 halfway around the pulley-shaped weight, thereby holding tensioning weight in place. As worktop 12 moves up and down during use, the power cord loop 33 changes size, but since tensioning weight 29 is always secured within loop 33, its weight will keep power cord 31 taut and the loop managed so that power cord 31 does not get tangled with nearby objects. The exact weight of tensioning weight 29 will depend on the type and flexibility of the power cord used, but it is expected to be between 8 ounces and one pound, sufficient to keep power cord 31 taut and straight regardless of the height of worktop 12, as shown in FIGS. 4 and 5. Power cord 31 is preferably fed through hollow portions of upper support frame 22 and connected to an outlet strip of several power outlets (can be conventional) and perhaps other communication connectors, which is positioned within wire management box 27. Wire management box 27 is secured to underside 16 of worktop 12 so that it moves up and down with any vertical displacement of worktop 12 during operation of workstation 10. Therefore, any electrically powered device located on work surface 14 or worktop 12 can be easily and effectively plugged into one of the outlets located within wire management box 27 without fear of entanglement during operation of workstation 10.

Communication:

According to yet another embodiment of the present invention, user use-data can be collected and stored by control circuit 50. Following a predetermined download schedule, control circuit 50 can use the Blue-Tooth® module 54 (or WIFI) to link up with the Internet either directly or through the user's computer and transmit the stored user use-data to remote servers for product validity and user evaluation. Applicants contemplate providing a service for users wherein qualified personnel may review the user use-data and other user-profile information, fitness history to help recommend a refined fitness schedule to allow the user to better reach their fitness goals. In such instance, two-way communication between the remote servers and the user's workstation may occur through the Internet and either the Blue-Tooth® module 54, a WIFI connection, or perhaps a hard wire connection. The remote servers can also use this communication link to provide firmware updates as necessary. This communication feature would allow the user to receive weekly or monthly reports showing health improvement, total times standing and equivalent calories burned daily, weekly and total to date, as well as other collected and monitored data. The user would hopefully look forward to receiving their "report card" and would be encouraged to stay with their schedule.

All user-inputted data and settings and collected data can be automatically backed-up at a remote memory location so that the appropriate data and settings can be recalled if necessary, such as if the user disconnects all power to workstation 10 or upgrades to another workstation 10.

Improvements in Workstation-User Sensing:

According to previous embodiments described in this patent application, mat 36, ultrasonic range finder 66, thermopile 68 (such as a passive infrared—PIR), and microphone 70 are used independently or in any combination to detect when a user is nearby or adjacent to the workstation (i.e., "is present"). Such user-detection allows important features of the workstation to function, including:

a) Only operating drive motors 74 when a user's presence is detected (a safety feature);

b) Driving drive motors 74 to allow worktop 12 to move quickly up and down as a greeting (and also as a reminder to use workstation 10) when a user first arrives at the workstation, as detected by the sensors and perhaps in the morning; and c) To only calculate stand-time by the user when the user is actually present at the workstation, again as detected by the user.

Applicants have further contemplated that it would be beneficial for the workstation of this invention to not only 'know" when a person is present at the workstation, but more particularly, to either know if and when the "primary user" of the workstation is present at the workstation, or if not the primary user, to know the identity of whoever is using the particular workstation, perhaps a coworker, the user's boss, or other.

If local sensors cannot accurately detect the presence of the primary user, the workstation will assume that any detected person using the primary user's workstation is in fact the primary user and may respond by switching from standby mode to an operational mode. Such a false detection could lead to inaccurate collected data and would likely result in the workstation poorly meeting the true needs of the primary user. Also, the collected data will yield inaccurate and unreliable trends and statistics of the assumed primary user.

To overcome this potential problem and according to another embodiment of the invention, workstation 10, includes any combination of several sensors, including the above-described mat 36, ultrasonic range finder 66, and thermopile 68 and uses them to create and store an "electronic signature" of a select primary user (the person who regularly uses the particular workstation). This "smart sensing" arrangement allows the present system to accurately determine when a particular person is present at the workstation at any given time and who that person is (or, depending on how the system is set up, to determine who that person is not). For example, a primary user may have habits that can be repeatedly detected by the system, electronically stored within electronic memory, electronically compared and used to ID the current user, or at least used to determine when the person present at the workstation has a signature that is stored within the system. Such habits may include a unique standing pattern (e.g., the user may consistently stand between 2 and 4 inches from the edge of the worktop 12), having a strong and unique body heat pattern that is located at a specific region of the field of view of the sensors, the type of music that the user plays, the user's voice, any tapping the user does against the worktop, the selected height of the worktop 12, or the user's time schedule or known routine. According to one of the embodiments, one of the sensors is a Bluetooth® (or similar) controlled sensor that is able to accurate detect and read an RFID located on the user's body, such as embedded within the user's building ID badge.

If other workers (non-primary users) in the office stop by to visit the primary user's workstation when the primary user is not at the workstation, the sensor array located within and adjacent to the workstation will detect electronic parameters that are particular to the visitor and will store this information along with the time of the visit, the duration of the visit, the visitor's name (if determined by the workstation), the date, and perhaps how much the visitor weighs. By providing "smart sensing", the workstation according to this embodiment of the invention can detect and generate a visitor's and user's log for review by the primary user upon his or her return. Additionally, the workstation can automatically activate a flash-memory voice-recorder when requested to do so by any of the visitors so that the visitor may leave a voice message for the primary user.

By using "smart sensing" with each workstation located within a work environment, the smart sensing system, according to this embodiment of the invention may collect all sensed information and may use this information to help track workers efficiency and attendance. It is not Applicant's desire to create a sensing system that will collect information on the workers of a company to benefit "Big Brother" or to be used against any particular worker, but instead to use this collected information to provide general statistical data regarding a group of workers, such as, what is the average "desk-occupancy" of the workers in the engineering department.

Such "smart sensing" of the present workstation can additionally be used for the following:

1. The collected information can be used to determine which employees are in attendance at a company on any given day, such as engineers, CAD people, sourcing, designers, etc.) to help management manage daily resources and work distribution.

2. The collected information can be used to automatically keep track of billing by determining which workers are working at their desk and for how long each day to improve efficiency and billing accuracy.

3. The collected information can be used to better manage telecommuting, sick-leave, vacations, lunch hours and even smoking breaks.

4. The collected information can be used to learn trends and routines and help the primary user plan ahead for the day's events. For example, as lunchtime on Wed approaches, the system can provide the primary user a list of menus or other information of local restaurants and can even tap into Internet resources to provide wait-time information. Other useful information includes traffic reports or train schedules or train delays, and even weather. This information can be automatically downloaded to the primary user's smart phone, if desired.

5. The collected information can also be used to measure the body temperature of the primary user in an effort to detect the onset of a potential illness, fever, or stress levels. The workstation can use this information to change the sit-stand schedule or perhaps recommend that the user take a break, a vacation, or sick day. Other sensors can be used to measure the heart rate, or other vitals of the primary user.

6. The collected information can be used to power down any combination or all electrical devices connected to or otherwise associated with the user's workstation. For example, if the local sensors connected to the workstation detect that the primary user is no longer at the workstation, the system can turn off the desk lamp located on the worktop and put the computer into a sleep mode. Additionally, the system can turn on various and appropriate announcements on the phone, as predetermined by the user.

According to another embodiment of the disclosure, the drive motors used to raise and lower worktop 12 can be impulse drive so worktop 12 raises or lowers a very small amount (as described in greater detail above), such as a couple of mm. According to this embodiment, this quick movement can be used to help convey the passage of time, such as providing a little "dip" movement every hour, or to alert the user that a scheduled even is soon approaching.

While the invention may be susceptible to various modifications and alternative forms, specific embodiments have been shown by way of example in the drawings and have been described in detail herein. However, it should be understood that the invention is not intended to be limited to the particular forms disclosed. Thus, the invention is to cover all modifications, equivalents, and alternatives falling within the spirit and scope of the invention as defined by the following appended claims.

What is claimed is:

1. A system for adjusting the height of a workstation for use by a user, the system comprising:
a frame;
a worktop having an upper work surface, the worktop being vertically slidably attached to said frame and selectably adjustable in elevation to different positions including at least a first standing position and at least a first sitting position;
a memory device storing at least the first standing position and the first sitting position;
at least one variable speed electrically-powered vertical-displacement drive mechanism connected between said frame and said worktop, said drive mechanism arranged to selectively vertically displace the worktop with respect to said frame when said drive mechanism is activated; and
a processor linked to the memory device and the drive mechanism and controlling the drive mechanism to move the worktop to different positions; and
a user interface supported by the worktop, the interface including an upper surface and a lower surface that face upwardly and downwardly, respectively, the interface further including at least one sensor for sensing contact with the upper and lower surfaces, respectively, the interface linked to the processor, the processor programmed to perform the steps of:
(i) while the worktop is in the first sitting position:
(a) upon sensing a quick upward double activation of the user interface, controlling the drive mechanism to move the worktop from the first sitting position to the first standing position; and
(b) upon sensing a prolonged single upward activation of the user interface, controlling the drive mechanism to move the worktop upward from the first sitting position toward the first standing position and continuing to drive the worktop upward as long as the prolonged single upward activation persists.

2. The system of claim 1 wherein the lower surface is below the upper work surface and the upper surface is above the lower surface.

3. The system of claim 2 wherein the sensor includes first and second pressure sensors adjacent the upper and lower surfaces, respectively.

4. The system of claim 3 wherein the processor controls the drive mechanism to move the worktop at different rates during prolonged upward activation wherein the rate depends on the magnitude of pressure applied to the sensor.

5. The system of claim 4 wherein the upper and lower surfaces are located adjacent the upper worksurface and an undersurface of the worktop, respectively.

6. The system of claim 4 wherein the interface is integrated into the worktop so that the lower surface of the interface is located adjacent the undersurface of the worktop.

7. The system of claim 4 wherein the interface enables a user to change between first and second rates without halting worktop movement by changing pressure on the upper and lower surfaces.

8. The system of claim 1 wherein the upper and lower surfaces of the interface are located below the upper surface of the worktop.

9. The system of claim 1 wherein the processor is programmed to control worktop height displacement at different rates at different times.

10. The system of claim 1 wherein the processor is programmed to control worktop height displacement at different rates during at least some continuous worktop height displacements.

11. The system of claim 1 wherein the processor programmed to perform the steps of:

(i) while the worktop is in the first standing position:
  (a) upon sensing a quick downward double activation of the user interface, controlling the drive mechanism to move the worktop from the first standing position to the first sitting position; and
  (b) upon sensing a prolonged single downward activation of the user interface, controlling the drive mechanism to move the worktop downward from the first standing position toward the first sitting position and continuing to drive the worktop downward as long as the prolonged single downward activation persists capacitive switch pressure membrane switch.

12. The system of claim 11 wherein the sensor is a pressure sensor and wherein the processor controls the rate of worktop height displacement based at least in part of the magnitude of the pressure applied to the interface during a prolonged activation.

13. The system of claim 1 wherein the processor is programmed to control the drive mechanism to move the worktop from a current position to the sitting position and from the current position to the standing position upon detecting quick downward double activation and quick upward double activation, respectively.

14. The system of claim 1 wherein the processor is programmed to provide periodic reminders to a system user to change the height of the worktop, the processor providing a reminder by automatically changing the height of the worktop from a current initial position to another position so that a user in physical contact with the worktop senses the movement via touch.

15. The system of claim 14 wherein the processor provides the reminder by automatically changing the worktop height through a cycle that drives the worktop from the current initial position to another position and back to the initial position.

16. The system of claim 15 wherein the difference between the current position and the another position is one inch or less.

17. The system of claim 15 wherein the processor is programmed to accelerate the rate of worktop displacement from the initial position to a first speed, decelerate the rate of worktop displacement from the first speed to another position, accelerate the rate of worktop displacement from the another position toward the initial position and decelerate the worktop displacement as the worktop approaches the initial position.

18. The system of claim 17 wherein the displacement cycle is repeated a plurality of times in a sequence without delay between consecutive cycles in the sequence.

19. The system of claim 17 wherein the frequency of the cycle is between 12 and 18 cycles per minute and wherein the vertical distance between the initial position and the another position is less than 5 inches.

20. The system of claim 1 wherein the processor is programmed to control the rate of worktop displacement through a movement cycle that includes a first displacement rate and acceleration up to a second displacement rate without halting movement between the first and second displacement rates.

21. The system of claim 20 wherein changes between the first and second displacement rates are automatically controlled by the processor.

22. A system for adjusting the height of a workstation for use by a user, the system comprising:

a frame;
a worktop having an upper work surface and an undersurface, the worktop being vertically slidably attached to said frame and selectably adjustable in elevation to different positions including at least a first standing position and at least a first sitting position;
at least one variable speed electrically-powered vertical-displacement drive mechanism connected between said frame and said worktop, said drive mechanism being arranged to selectively vertically displace the worktop with respect to said frame when said drive mechanism is activated;
a processor controlling the drive mechanism to move the worktop to different positions; and
a user interface linked to the processor and supported by the worktop, the interface including oppositely facing upper and lower surfaces, the upper surface facing upward and the lower surface facing downward, the lower surface accessible at a height below the height of the worktop undersurface and the upper surface disposed above the lower surface,
wherein, the processor is programmed to perform the steps of:
(i) while the worktop is in the first sitting position:
  (a) upon sensing a quick upward double activation of the user interface, controlling the drive mechanism to move the worktop from the first sitting position to the first standing position; and
  (b) upon sensing a prolonged single upward activation of the user interface, controlling the drive mechanism to move the worktop upward from the first sitting position toward the first standing position and continuing to drive the worktop upward as long as the prolonged single upward activation persists;
(ii) while the worktop is in the first standing position:
  (a) upon sensing a quick downward double activation of the user interface, controlling the drive mechanism to move the worktop from the first standing position to the first sitting position; and
  (b) upon sensing a prolonged single downward activation of the user interface, controlling the drive mechanism to move the worktop downward from the first standing position toward the first sitting position and continuing to drive the worktop downward as long as the prolonged single downward activation persists capacitive switch pressure membrane switch.

23. The system of claim 22 wherein the interface includes a pressure sensor.

24. The system of claim 23 wherein the lower surface of the interface is spatially below the undersurface of the worktop.

25. The system of claim 23 wherein the upper surface of the interface is substantially parallel to the upper worktop surface and wherein the lower surface of the interface is substantially parallel to the undersurface of the worktop.

26. The system of claim 25 wherein each of the upper and lower interface surfaces is at a height that is below the height of the upper surface of the worktop.

27. The system of claim 26 wherein the interface is integrated into the worktop.

28. The system of claim 22 wherein the interface includes a pressure sensitive sensor that can detect at least two different upward pressures and two different downward pressures applied to the interface.

29. A system for adjusting the height of a workstation for use by a user, the system comprising:

a frame;

a worktop having an upper work surface, the worktop being vertically slidably attached to said frame and selectably adjustable in elevation to different positions including at least a first standing position and at least a first sitting position;

at least one variable speed electrically-powered vertical-displacement drive mechanism connected between said frame and said worktop, said drive mechanism being arranged to selectively vertically displace the worktop with respect to said frame when said drive mechanism is activated; and an interface including an upper surface and a lower surface that face upwardly and downwardly, respectively, the lower surface located within a space below the upper work surface, first and second pressure sensors located at the upper surface and the lower surface, respectively;

a processor controlling the drive mechanism to move the worktop among different positions, the processor controlling the drive mechanism to control the rate of worktop height displacement at various speeds including at least a first speed and a second speed that is different than the first speed, the processor programmed to perform the steps of:

(i) while the worktop is in a position below the first standing position:
   (a) upon sensing a quick upward double activation of the user interface, controlling the drive mechanism to move the worktop from the current position to the first standing position; and
   (b) upon sensing a prolonged single upward activation of the user interface, controlling the drive mechanism to move the worktop upward from the current position toward the first standing position and continuing to drive the worktop upward as long as the prolonged single upward activation persists;

(ii) while the worktop is in a position above the first sitting position:
   (a) upon sensing a quick downward double activation of the user interface, controlling the drive mechanism to move the worktop from the current position to the first sitting position; and
   (b) upon sensing a prolonged single downward activation of the user interface, controlling the drive mechanism to move the worktop downward from the current position toward the first sitting position and continuing to drive the worktop downward as long as the prolonged single downward activation persists capacitive switch pressure membrane switch; and wherein the rate of height displacement during prolonged interface activations is at a first rate when force sensed by one of the sensors is below a threshold force and is at a second rate when force sensed by one of the sensors is above the threshold force.

30. The system of claim 29 wherein each of the first and second sensors includes each of a capacitive contact sensor and a pressure membrane sensor, each contact sensor sensing contact and each of the pressure membrane sensors sensing pressure over the threshold level.

\* \* \* \* \*